(12) United States Patent
Lei

(10) Patent No.: US 11,651,585 B2
(45) Date of Patent: May 16, 2023

(54) IMAGE PROCESSING APPARATUS, IMAGE RECOGNITION SYSTEM, AND RECORDING MEDIUM

(71) Applicant: FUJITSU LIMITED, Kawasaki (JP)

(72) Inventor: Xuying Lei, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 308 days.

(21) Appl. No.: 17/184,646

(22) Filed: Feb. 25, 2021

(65) Prior Publication Data

US 2021/0303894 A1 Sep. 30, 2021

(30) Foreign Application Priority Data

Mar. 26, 2020 (JP) .............................. JP2020-056583

(51) Int. Cl.
*G06V 10/74* (2022.01)
*G06V 10/764* (2022.01)
(Continued)

(52) U.S. Cl.
CPC .......... *G06V 10/764* (2022.01); *G06F 18/214* (2023.01); *G06T 5/003* (2013.01); *G06V 10/776* (2022.01); *G06V 10/82* (2022.01)

(58) Field of Classification Search
CPC .... G06V 10/764; G06V 10/776; G06V 10/82; G06F 18/214; G06T 5/003
(Continued)

(56) References Cited

U.S. PATENT DOCUMENTS 10,740,593 B1* 8/2020 Kim .................... G06F 18/2113
2019/0080235 A1 3/2019 Maruhashi
(Continued)

FOREIGN PATENT DOCUMENTS

EP 3623793 A1 3/2020
JP 2019-049782 A 3/2019
(Continued)

OTHER PUBLICATIONS

Z. Cheng, H. Sun, M. Takeuchi and J. Katto, "Energy Compaction-Based Image Compression Using Convolutional AutoEncoder," in IEEE Transactions on Multimedia, vol. 22, No. 4, pp. 860-873, Apr. 2020, doi: 10.1109/TMM.2019.2938345. (Year: 2020).*
(Continued)

*Primary Examiner* — Neil R McLean
(74) *Attorney, Agent, or Firm* — Fujitsu Patent Center

(57) ABSTRACT

An image processing apparatus, includes a memory; and a processor coupled to the memory and the processor configured to: identify a first recognition error, the first recognition error being an error between ground truth data and a first recognition result obtained by inputting a first feature of image data into a first image recognition model, generate a second feature obtained by adding noise to the first feature of the image data, identify a second recognition error, the second recognition error being an error between the first recognition result and a recognition result obtained by inputting the second feature into a second image recognition model, and execute training of the first image recognition model and the second image recognition model based on the first recognition error and the second recognition error.

10 Claims, 31 Drawing Sheets

(51) Int. Cl.
    *G06T 5/00*     (2006.01)
    *G06F 18/214*     (2023.01)
    *G06V 10/776*     (2022.01)
    *G06V 10/82*     (2022.01)

(58) Field of Classification Search
    USPC .......................................................... 382/309
    See application file for complete search history.

(56) References Cited

U.S. PATENT DOCUMENTS

2019/0220675 A1     7/2019   Guo et al.
2020/0134385 A1*   4/2020   Yin ........................ G06F 18/214

FOREIGN PATENT DOCUMENTS

JP     2019-125369 A     7/2019
WO     2018/207524 A1     11/2018

OTHER PUBLICATIONS

Lucas Theis et al., "Lossy Image Compression with Compressive Autoencoders", ICLR 2017, pp. 1-19, arXiv:1703.00395v1 [stat.ML] Mar. 1, 2017 (Total 19 pages).

* cited by examiner

| FIG. 3A | FIG. 3B |

| FIG. 4A | FIG. 4B |

| FIG. 13A | FIG. 13B |

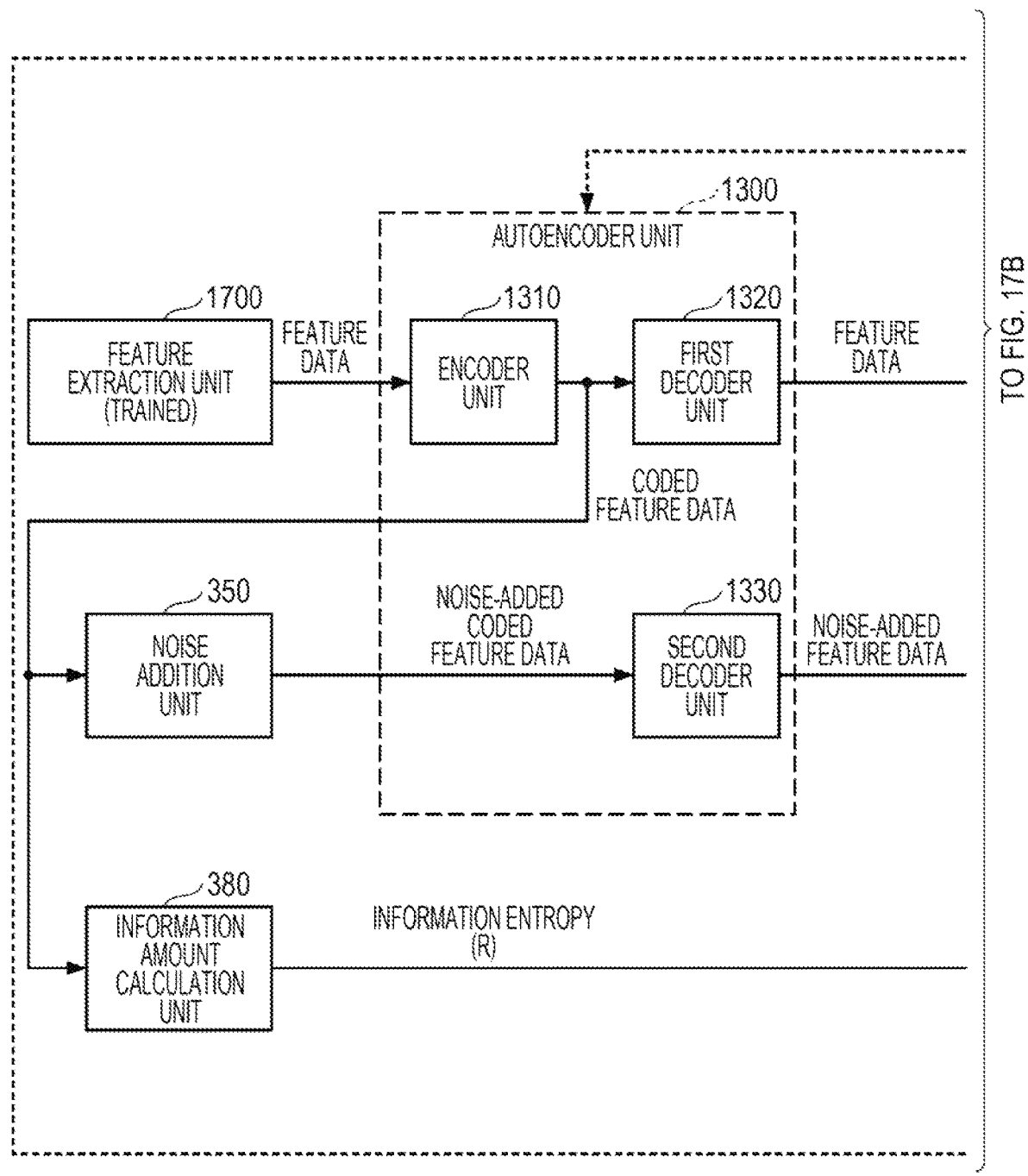

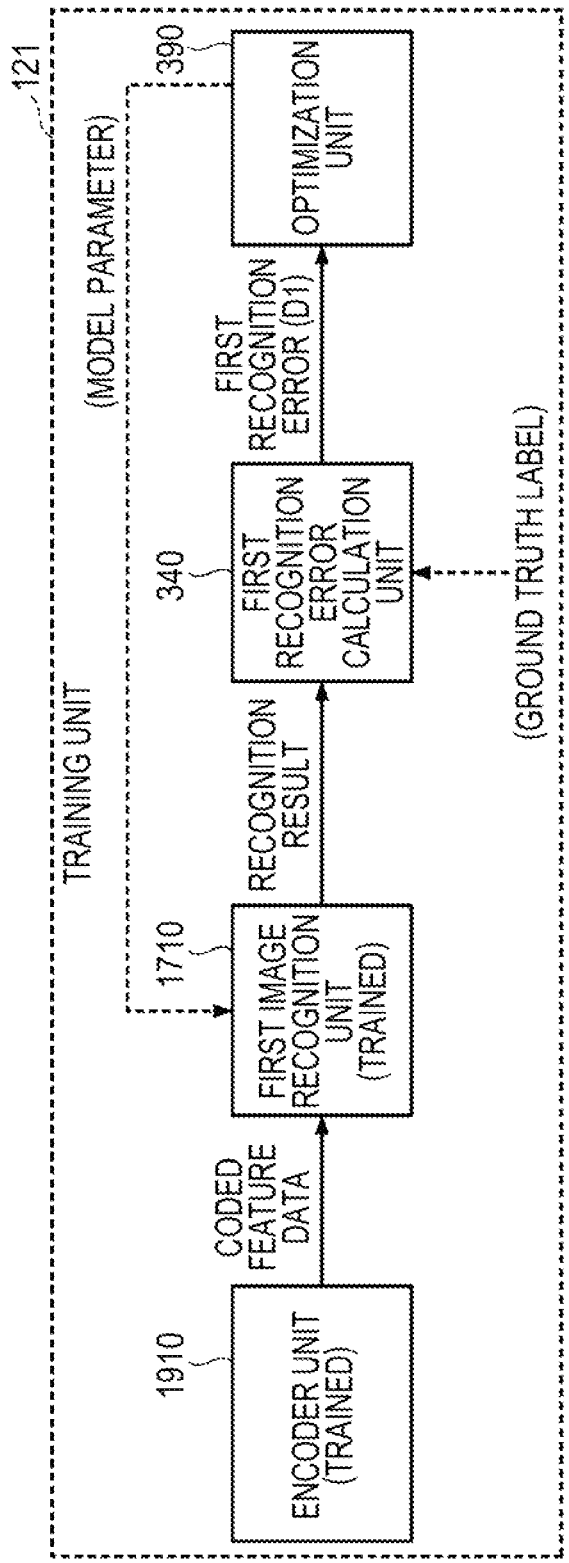

IMAGE PROCESSING APPARATUS, IMAGE RECOGNITION SYSTEM, AND RECORDING MEDIUM

CROSS-REFERENCE TO RELATED APPLICATION

This application is based upon and claims the benefit of priority of the prior Japanese Patent Application No. 2020-56583, filed on Mar. 26, 2020, the entire contents of which are incorporated herein by reference.

FIELD

The embodiments discussed herein are related to an image processing apparatus, an image recognition system, and a recording medium.

BACKGROUND

Image recognition is one of pattern recognition technologies for recognizing features of a face, a character, or the like from image data such as a still image or a moving image and detecting the face or the character.

A convolutional neural network (CNN), which is a representative technique of deep learning used in the field of image recognition, is a neural network having a plurality of layers and realizes excellent recognition accuracy in the field.

On the other hand, in the field of image compression, compressive autoencoder (CAE) using a CNN-based autoencoder is known as a compression processing technology for compressing image data using a neural network.

According to the compression processing technology, it is possible to reduce an amount of image data while minimizing an error between the image data without being compressed and the image data after being compressed and decoded. Lucas Theis, Wenzhe Shi, Andrew Cunningham, and Ferenc Huszar, "Lossy image compression with compressive autoencoders" In ICLR 2017, Mar. 1, 2017 is known as related art.

SUMMARY

According to an aspect of the embodiments, an image processing apparatus, includes a memory; and a processor coupled to the memory and the processor configured to: identify a first recognition error, the first recognition error being an error between ground truth data and a first recognition result obtained by inputting a first feature of image data into a first image recognition model, generate a second feature obtained by adding noise to the first feature of the image data, identify a second recognition error, the second recognition error being an error between the first recognition result and a recognition result obtained by inputting the second feature into a second image recognition model, and execute learning of the first image recognition model and the second image recognition model based on the first recognition error and the second recognition error.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 17A and 17B illustrate an example of the functional configuration of the training unit at the time of training processing of the autoencoder unit;

FIGS. 22A and 22B illustrate a functional configuration of a training unit at the time of retraining processing of a trained first image recognition unit, and a flowchart illustrating a flow of the retraining processing of the trained first image recognition unit;

DESCRIPTION OF EMBODIMENTS

Figure 1A:
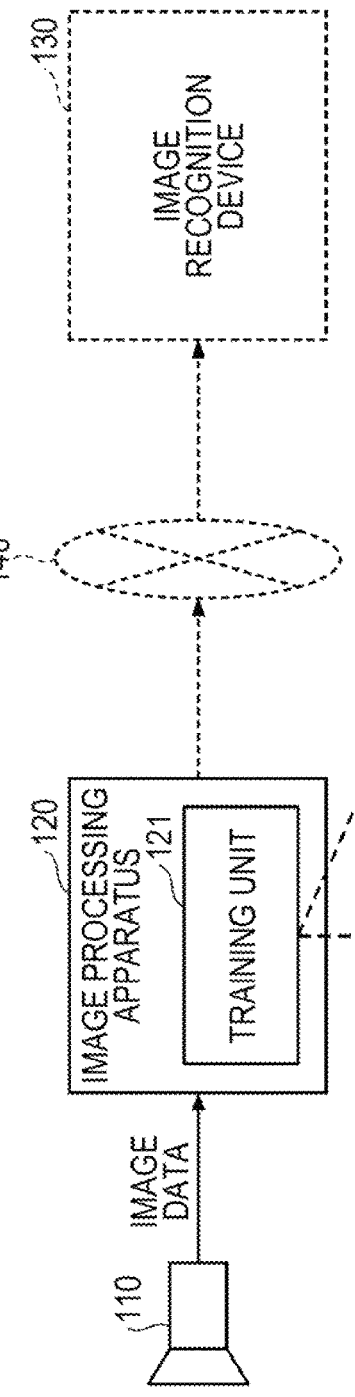
FIGS. 1A and 1B are a first diagram illustrating an example of a system configuration of an image recognition system.

However, the CNN used in the field of image recognition described above takes into consideration only an improvement in recognition accuracy, and is ineffective in reducing the amount of data in terms of image compression.

In view of the above, in image recognition processing, it is desirable to reduce the amount of image data while maintaining the recognition accuracy.

Each embodiment will be described below with reference to the attached drawings. Note that, in this specification and the drawings, components having substantially the same functional configuration are denoted by the same reference numerals, and redundant description is omitted.

First Embodiment

<System Configuration of Image Recognition System>

Figure 1B:
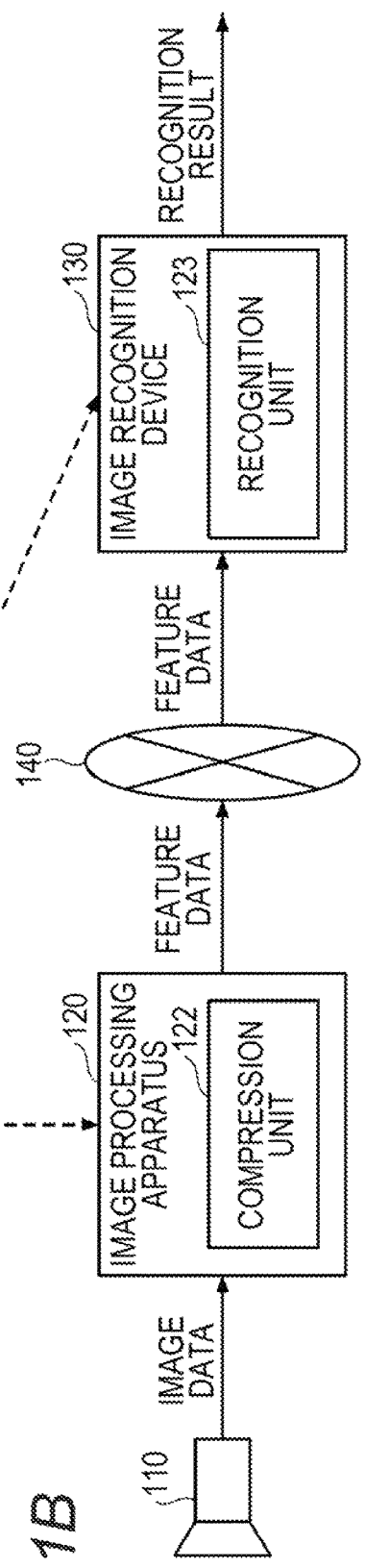

First, a system configuration of an image recognition system according to a first embodiment will be described. FIGS. 1A and 1B are a first diagram illustrating an example of the system configuration of the image recognition system. Processing executed by an image recognition system 100 in the present embodiment is roughly divided into a training phase and a compression and recognition phase.

FIG. 1A illustrates the system configuration of the image recognition system in the training phase, and FIG. 1B illustrates the system configuration of the image recognition system in the compression and recognition phase.

As illustrated in FIG. 1A, the image recognition system 100 in the training phase includes an image pickup device 110 and an image processing apparatus 120.

The image pickup device 110 captures an image at a predetermined frame period, and transmits image data to the image processing apparatus 120. Note that the image data includes an object to be recognized.

An image processing program is installed in the image processing apparatus 120, and a training program included in the image processing program is executed in the training phase. Consequently, the image processing apparatus 120 in the training phase functions as a training unit 121.

The training unit 121 has a feature extraction model (CNN-based model) for extracting, from image data, features used for image data recognition processing. Furthermore, the training unit 121 has an image recognition model (fully connected (FC)-based model) that performs recognition processing using extracted features.

Furthermore, the training unit 121 executes training training processing of determining each model parameter of the feature extraction model and the image recognition model so as to reduce the amount of features that has been extracted while maintaining the image data recognition accuracy.

On the other hand, as illustrated in FIG. 1B, the image recognition system 100 in the compression and recognition phase includes the image pickup device 110, the image processing apparatus 120, and an image recognition device 130. Furthermore, the image processing apparatus 120 and the image recognition device 130 are communicably connected to each other via a network 140. Note that, among the devices included in the image recognition system 100 in the compression and recognition phase, the image pickup device 110 has already been described, and thus the description thereof will be omitted here.

On the other hand, as described above, an image processing program is installed in the image processing apparatus 120, and a compression program included in the image processing program is executed in the compression and recognition phase. Consequently, the image processing apparatus 120 in the compression and recognition phase functions as a compression unit 122.

Note that the compression unit 122 includes a trained feature extraction model, and when image data is input, features are output. The features output by the compression unit 122 are the minimum of features for maintaining the image data recognition accuracy (for example, compressed image data).

Furthermore, a recognition program is installed in the image recognition device 130. When the recognition program is executed, the image recognition device 130 functions as a recognition unit 123.

Note that the recognition unit 123, which includes a trained image recognition model, receives inputs of features, and then performs recognition processing and outputs a recognition result. The recognition result output by the recognition unit 123 is substantially equal to a recognition result in a case where recognition processing has been performed on the image data without being compressed. For example, according to the recognition unit 123, it is possible to maintain substantially the same recognition accuracy as the recognition accuracy in a case where recognition processing has been performed on the image data without being compressed.

<Hardware Configuration of Image Processing Apparatus>

Figure 2:
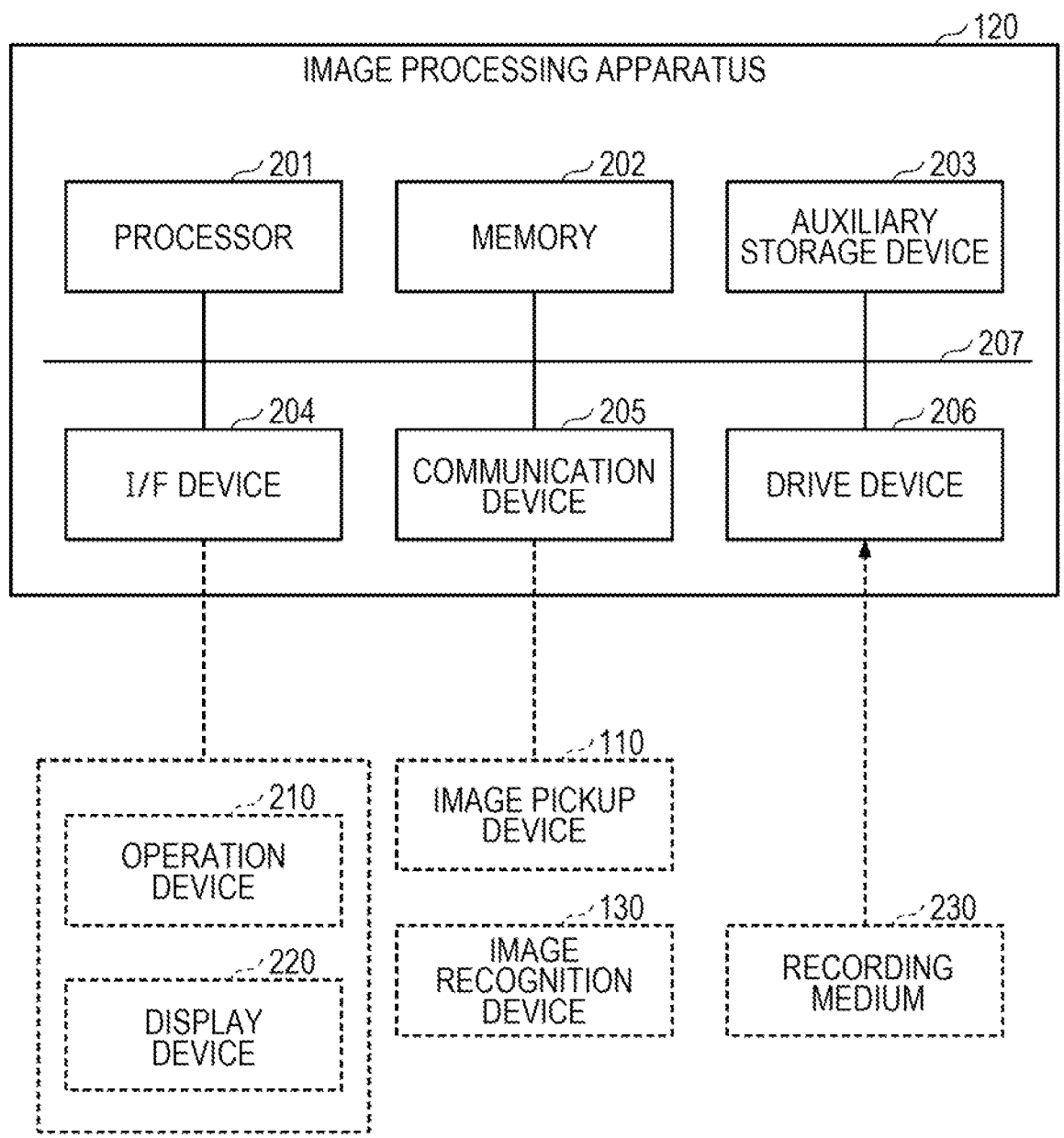
FIG. 2 illustrates an example of a hardware configuration of an image processing apparatus.

Next, a hardware configuration of the image processing apparatus 120 will be described. FIG. 2 illustrates an example of a hardware configuration of an image processing apparatus. The image processing apparatus 120 includes a processor 201, a memory 202, an auxiliary storage device 203, an interface (I/F) device 204, a communication device 205, and a drive device 206. Note that the pieces of hardware of the image processing apparatus 120 are connected to each other via a bus 207.

The processor 201 includes various arithmetic devices such as a central processing unit (CPU) and a graphics processing unit (GPU). The processor 201 reads various programs (for example, an image processing program) onto the memory 202 and executes them.

The memory 202 includes a main storage device such as a read only memory (ROM) or a random access memory (RAM). The processor 201 and the memory 202 form a so-called computer. The processor 201 executes various programs read on the memory 202 to cause the computer to implement various functions (details of the various functions will be described later).

The auxiliary storage device 203 stores various programs and various pieces of data used when the various programs are executed by the processor 201.

The I/F device 204 is a connection device that connects the image processing apparatus 120 with an operation device 210 and a display device 220, which are examples of external devices. The I/F device 204 receives an operation on the image processing apparatus 120 via the operation device 210. Furthermore, the I/F device 204 outputs a result of processing by the image processing apparatus 120, and displays the result via the display device 220.

The communication device 205 is a communication device for communicating with another device. In a case of the image processing apparatus 120, the image processing apparatus 120 communicates with other devices such as the image pickup device 110 and the image recognition device 130 via the communication device 205.

The drive device 206 is a device for setting a recording medium 230. The recording medium 230 referred to here includes a medium for optically, electrically, or magnetically recording information, such as a compact disk read only memory (CD-ROM), a flexible disk, or a magneto-optical disk. Alternatively, the recording medium 230 may include a semiconductor memory or the like that electrically records information, such as a ROM or a flash memory.

Note that various programs installed in the auxiliary storage device 203 may be installed, for example, by setting the distributed recording medium 230 in the drive device 206 and reading various programs recorded in the recording medium 230 by the drive device 206. Alternatively, the various programs to be installed on the auxiliary storage device 203 may be installed by being downloaded from a network via the communication device 205.

<Functional Configuration of Training Unit of Image Processing Apparatus>

Figures 3, 3A:
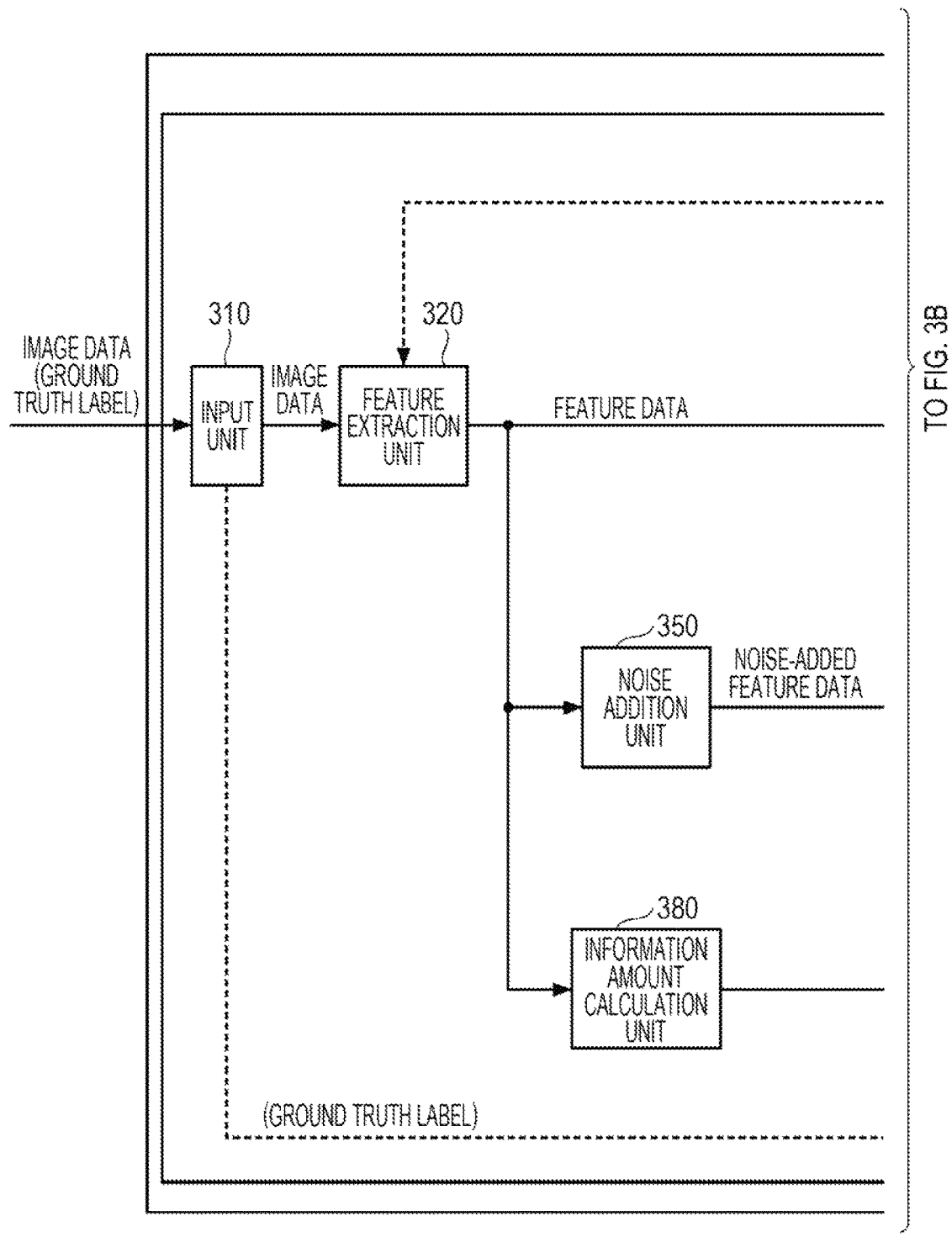
FIGS. 3A and 3B are a first diagram illustrating an example of a functional configuration of a training unit of the image processing apparatus.
Figure 3B:
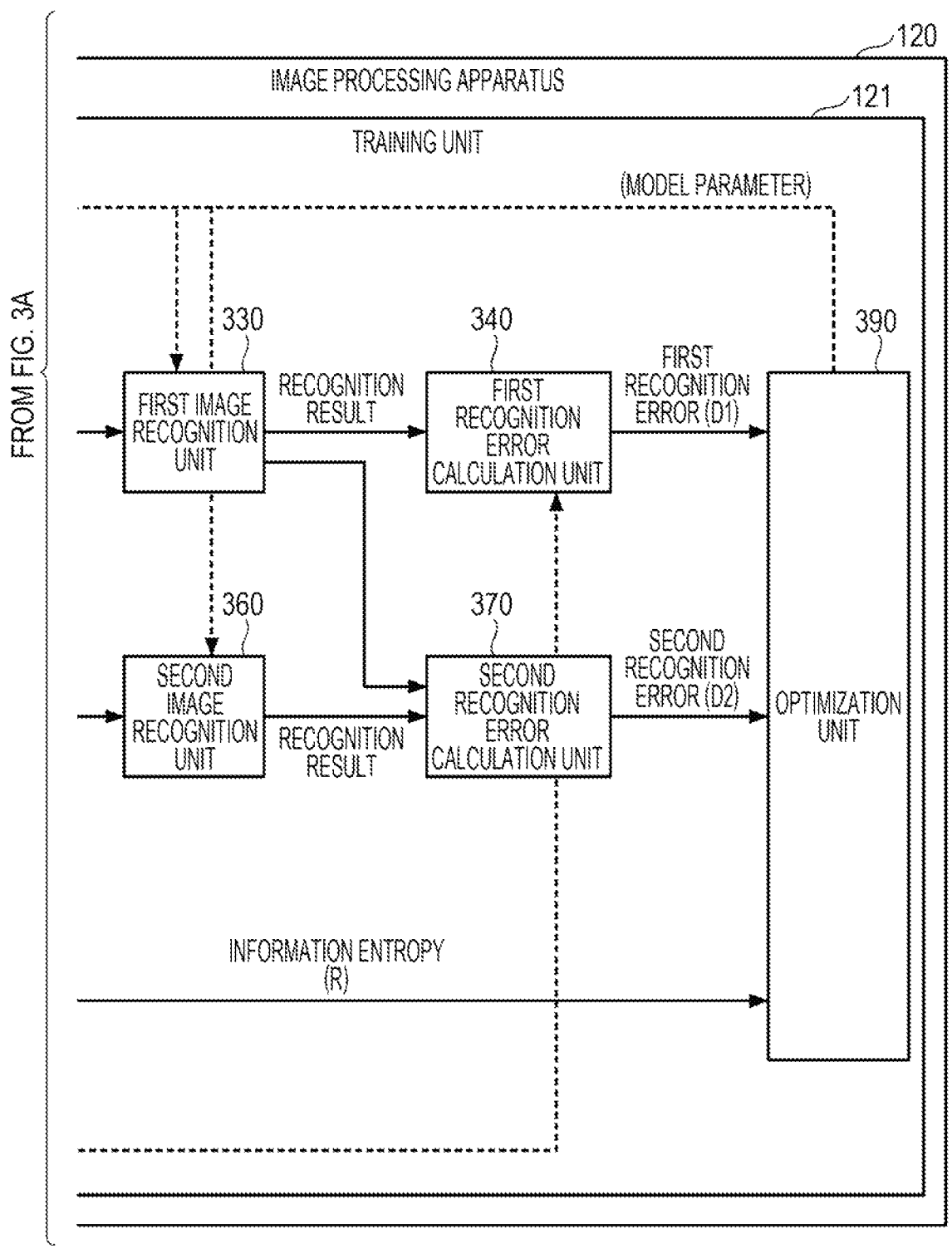

Next, a functional configuration of the training unit 121 of the image processing apparatus 120 will be described. FIGS. 3A and 3B are a first diagram illustrating an example of a functional configuration of a training unit of the image processing apparatus. As illustrated in FIGS. 3A and 3B, the training unit 121 includes an input unit 310, a feature extraction unit 320, a first image recognition unit 330, a first recognition error calculation unit 340, a noise addition unit 350, a second image recognition unit 360, a second recognition error calculation unit 370, an information amount calculation unit 380, and an optimization unit 390.

The input unit 310 acquires image data. Note that, in the training phase, the input unit 310 acquires image data associated with a ground truth label, and notifies the feature extraction unit 320 of the image data, and the first recognition error calculation unit 340 of the ground truth label.

The feature extraction unit 320 is a CNN-based model, and extracts features from image data. Model parameters of the feature extraction unit 320 are determined by the optimization unit 390.

The first image recognition unit 330, which is an FC-based model, performs recognition processing by using, as inputs, the features extracted by the feature extraction unit 320, and outputs a recognition result. Model parameters of the first image recognition unit 330 are determined by the optimization unit 390.

The first recognition error calculation unit 340 compares the recognition result output from the first image recognition unit 330 with the ground truth label associated with the acquired image data, and outputs a first recognition error (D1).

The noise addition unit 350 adds noises to the features extracted by the feature extraction unit 320 to generate noise-added features, which are the features after the addition of the noises.

The second image recognition unit 360, which is an FC-based model, performs recognition processing by using, as an input, the noise-added feature data generated by the noise addition unit 350, and outputs a recognition result. Model parameters of the second image recognition unit 360 are determined by the optimization unit 390.

The second recognition error calculation unit 370 compares the recognition result output from the second image recognition unit 360 with the recognition result output from the first image recognition unit 330, and outputs a second recognition error (D2).

From a probability distribution of the feature data extracted by the feature extraction unit 320, the information amount calculation unit 380 calculates information entropy (R) of the probability distribution.

The optimization unit 390 is an example of an execution unit. The optimization unit 390 calculates a cost on the basis of the first recognition error (D1) output from the first recognition error calculation unit 340, the second recognition error (D2) output from the second recognition error calculation unit 370, and the information entropy (R) output from the information amount calculation unit 380.

Furthermore, the optimization unit 390 executes training processing of determining the model parameters of the feature extraction unit 320, the first image recognition unit 330, and the second image recognition unit 360 so as to minimize the calculated cost.

Executing the training processing of determining the model parameters so as to minimize the cost in this way yields the following results: the first recognition error (D1) becomes smaller (for example, the recognition result becomes closer to the ground truth label); the second recognition error (D2) becomes smaller (for example, it is possible to scale the feature data and narrow down the feature data that is important for correctly recognizing the image data); and the information entropy (R) becomes smaller (for example, it is possible to reduce the amount of feature data).

As a result, the training unit 121 makes it possible to generate a model capable of reducing the amount of feature data while maintaining the recognition accuracy.

<Specific Examples of Processing by Each Unit Included in Training Unit>

Next, specific examples of processing by each unit (here, the feature extraction unit 320 to the optimization unit 390) Included in the training unit 121 will be described.

(1) Specific Example of Processing by Feature Extraction Unit

Figures 4, 4A:
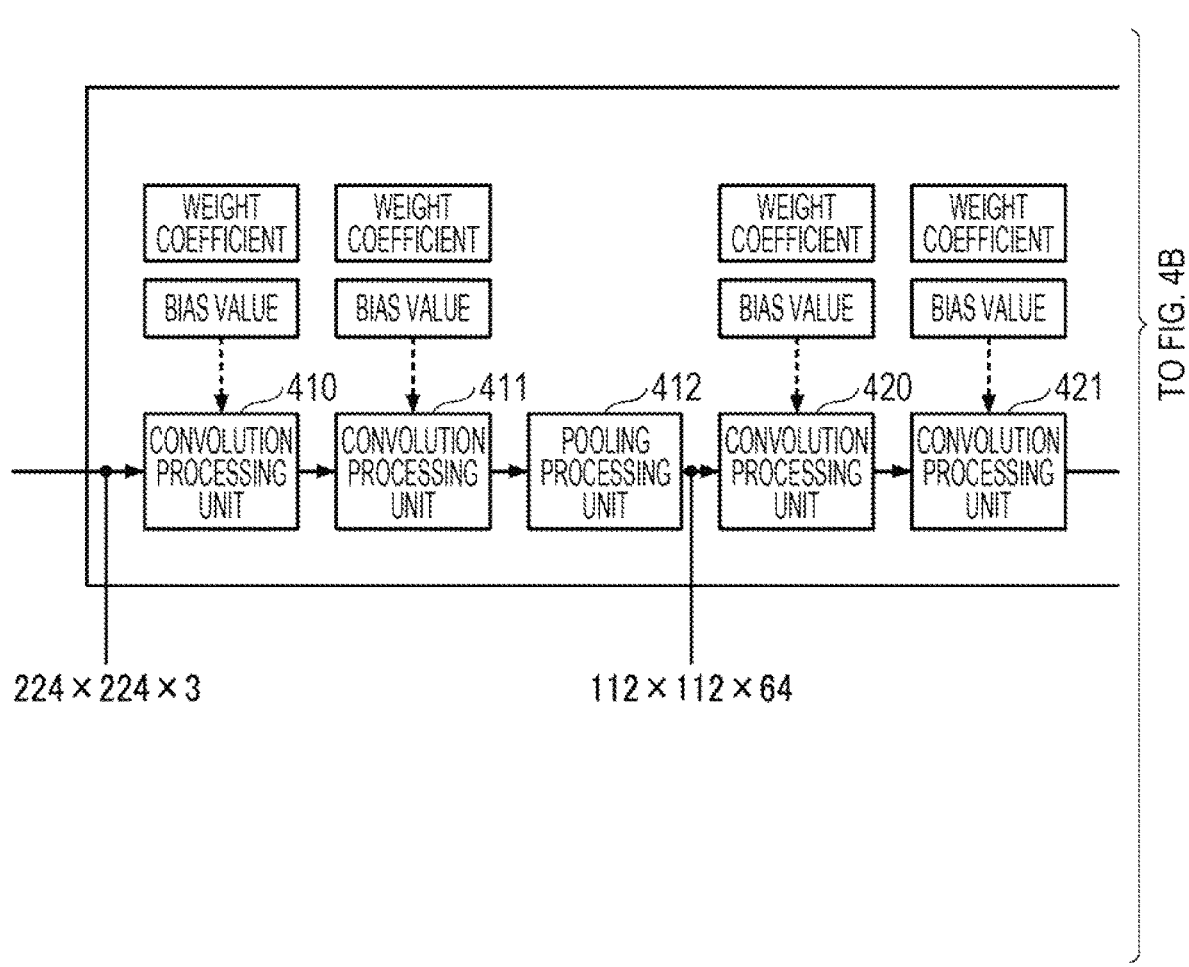
FIGS. 4A and 4B illustrate a specific example of processing by a feature extraction unit.
Figure 4B:
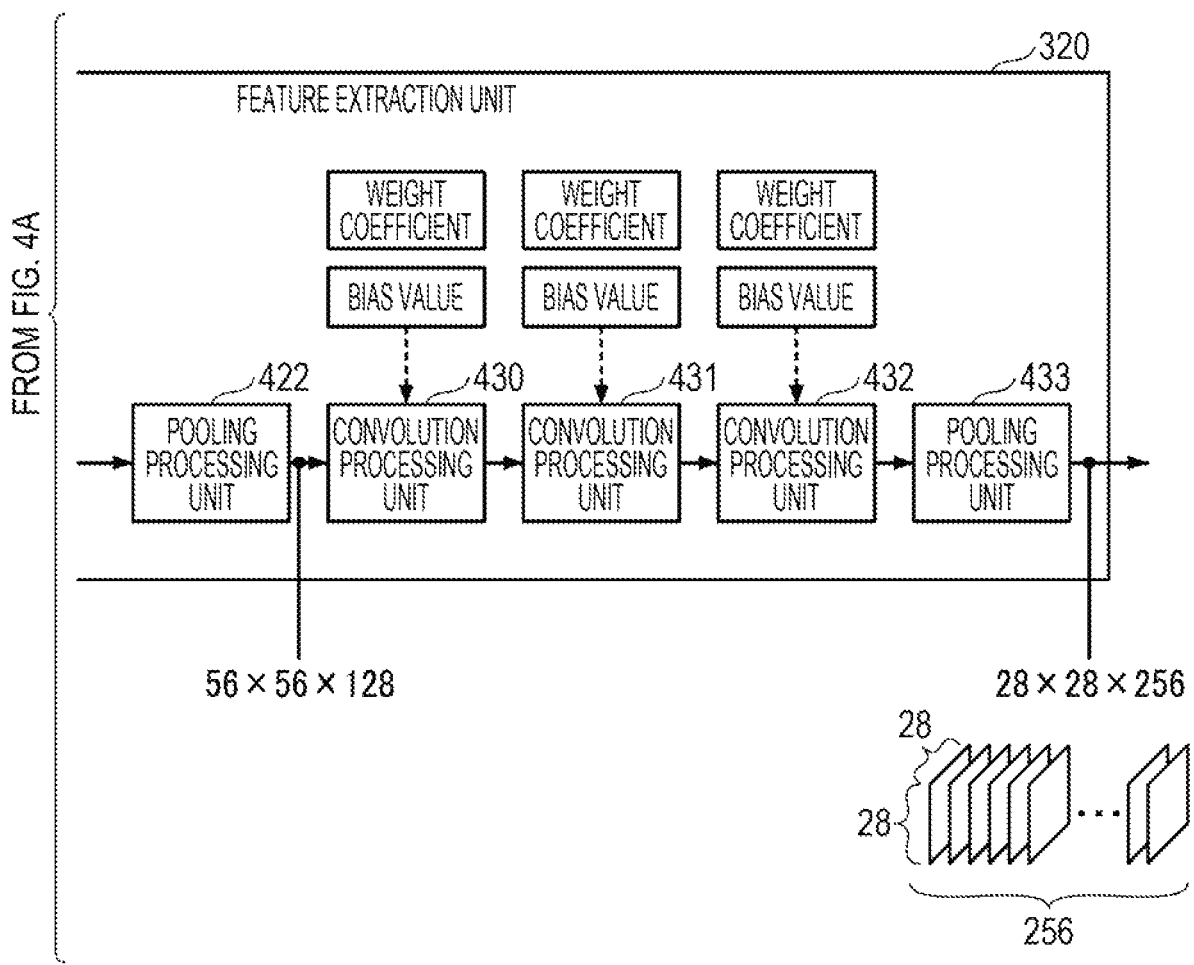

First, a specific example of processing by the feature extraction unit 320 will be described. FIGS. 4A and 4B illustrate a specific example of processing by a feature extraction unit. As illustrated in FIGS. 4A and 4B, in the first embodiment, the feature extraction unit 320 includes: convolution processing units 410 and 411 and a pooling processing unit 412; convolution processing units 420 and 421 and a pooling processing unit 422; and convolution processing units 430, 431, and 432 and a pooling processing unit 433.

According to the example in FIGS. 4A and 4B, when the feature extraction unit 320 receives an input of image data (224×224×3), each of the pooling processing units 412 and 422 outputs feature data (112×112×64 or 56×56×128). Moreover, the feature extraction unit 320 finally causes the pooling processing unit 433 to output feature data (28×28×256).

In the training phase, the optimization unit 390 determines model parameters (a weight coefficient and a bias value) of each of the convolution processing units 410, 411, 420, 421, 430, 431, and 432 of the feature extraction unit 320.

(2) Specific Example of Processing by Noise Addition Unit

Figure 5:
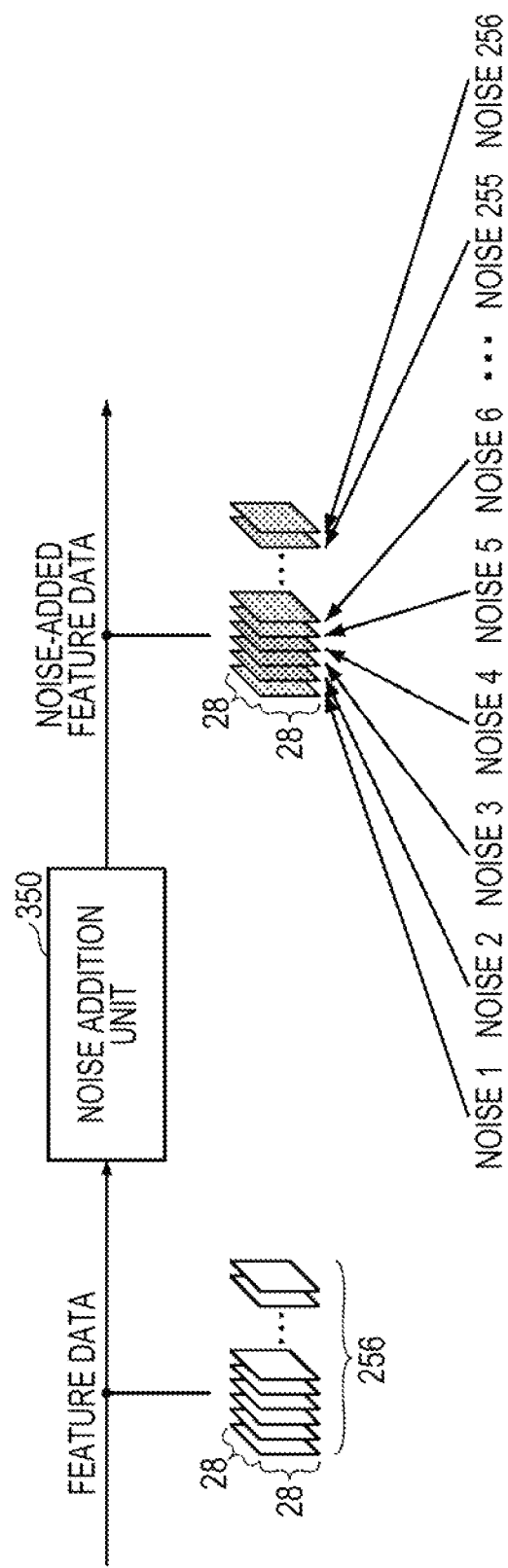
FIG. 5 illustrates a specific example of processing by a noise addition unit.

Next, a specific example of processing by the noise addition unit 350 will be described. FIG. 5 illustrates a specific example of processing by a noise addition unit. As illustrated in FIG. 5, when feature data (28×28×256) is input, the noise addition unit 350 adds each of noise 1 to noise 256. Noise 1 to noise 256 added by the noise addition unit 350 are noises that are uncorrelated with each other and have an average value of zero (so-called white noise).

Consequently, the noise addition unit 350 outputs noise-added feature data (28×28×256).

Figure 6:
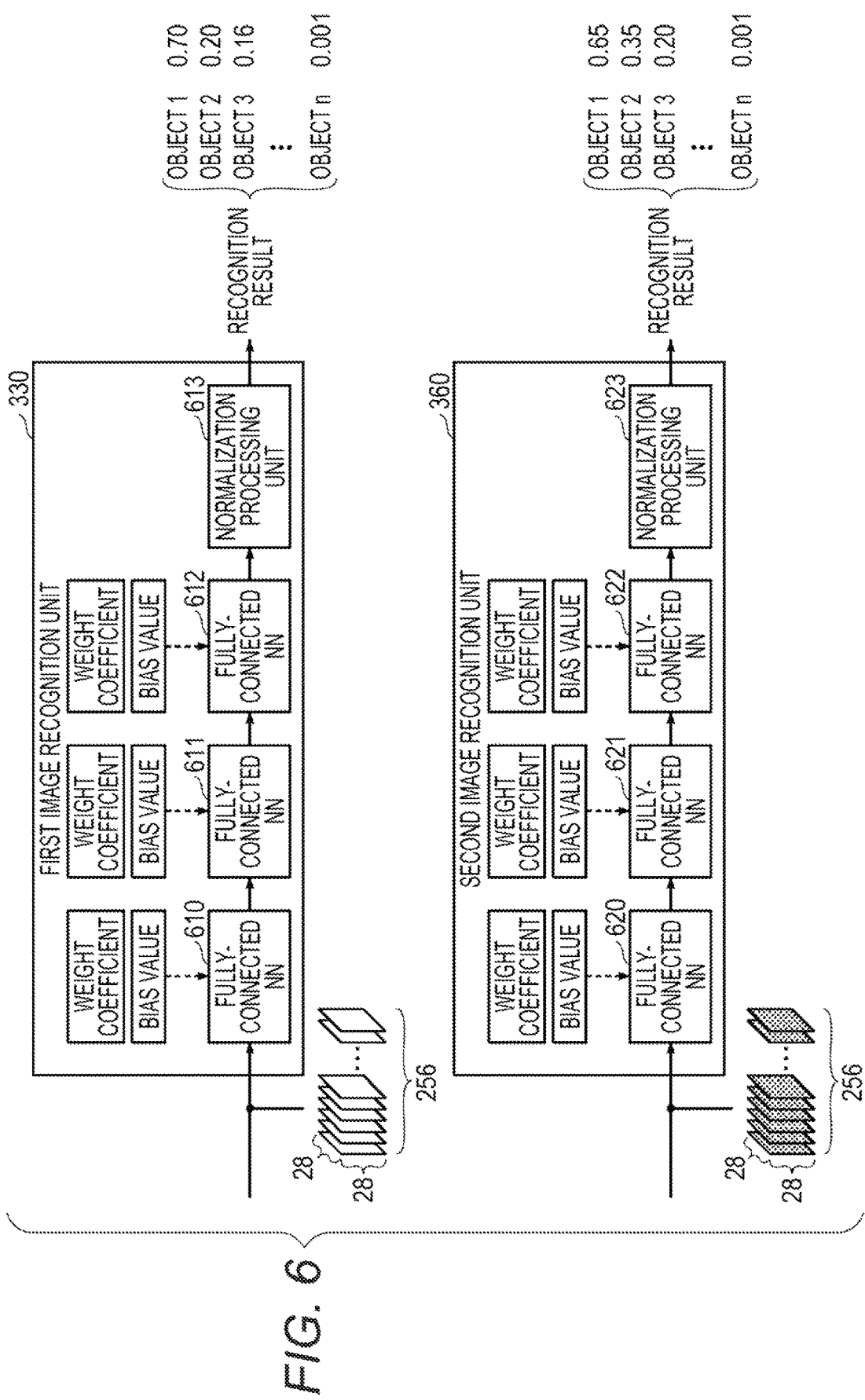
FIG. 6 illustrates a specific example of processing by first and second image recognition units.

(3) Specific Example of Processing by First Image Recognition Unit and Second Image Recognition Unit Next, a specific example of processing by the first image recognition unit 330 and the second image recognition unit 360 will be described. FIG. 6 illustrates a specific example of processing by first and second image recognition units. As illustrated in FIG. 6, in the first embodiment, the first image recognition unit 330 includes fully-connected neural networks (NNs) 610, 611, and 612 and a normalization processing unit 613, and the second image recognition unit 360 includes fully-connected NNs 620, 621, and 622, and a normalization processing unit 623.

According to the example in FIG. 6, when the first image recognition unit 330 receives an input of feature data (28×28×256), the normalization processing unit 613 outputs a recognition result. The example in FIG. 6 indicates that the normalization processing unit 613 outputs classification probabilities (classification probability data group) of n objects from object 1 to object n as a recognition result.

In a similar manner, when the second image recognition unit 360 receives an input of noise-added feature data (28×28×256), the normalization processing unit 623 outputs a recognition result. The example in FIG. 6 indicates that the normalization processing unit 623 outputs classification probabilities (classification probability data group) of n objects from object 1 to object n as a recognition result.

Figure 7:
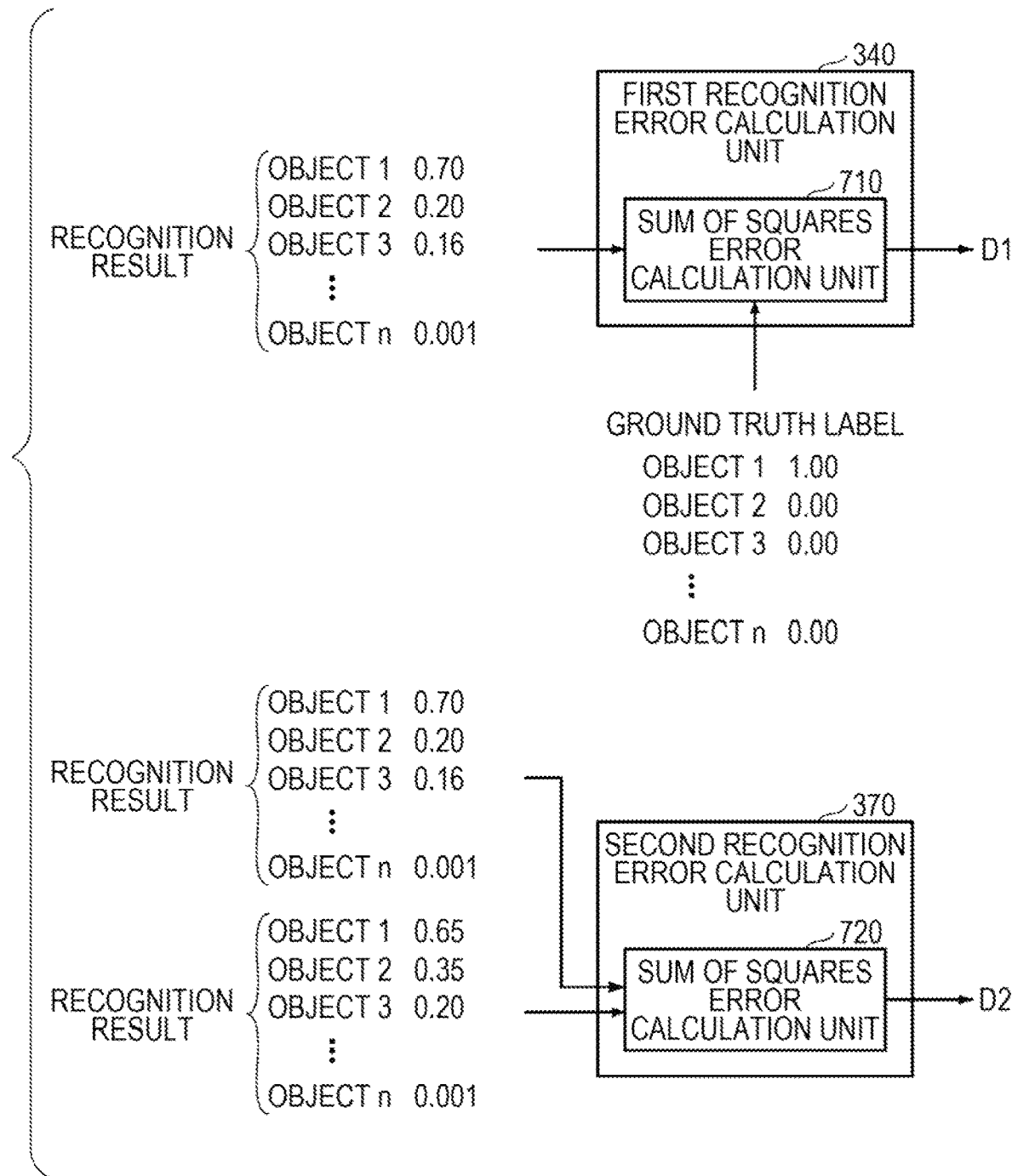
FIG. 7 illustrates a specific example of processing by first and second recognition error calculation units.

(4) Specific Example of Processing by First Recognition Error Calculation Unit and Second Recognition Error Calculation Unit Next, a specific example of processing by the first recognition error calculation unit 340 and the second recognition error calculation unit 370 will be described. FIG. 7 illustrates a specific example of processing by first and second recognition error calculation units. As illustrated in FIG. 7, in the first embodiment, the first recognition error calculation unit 340 includes a sum of squares error calculation unit 710, and the second recognition error calculation unit 370 includes a sum of squares error calculation unit 720.

According to the example in FIG. 7, when the first recognition error calculation unit 340 receives an input of a recognition result output from the first image recognition unit 330, the sum of squares error calculation unit 710 calculates a sum of squares error as an error between the recognition result and a ground truth label. Consequently, the first recognition error calculation unit 340 outputs a first recognition error (D1). Note that the ground truth label is a classification probability data group in which a classification probability of a ground truth object ("object 1" in the example in FIG. 7) among object 1 to object n is set to "1.00", and classification probabilities of other objects are set to "0.00".

In a similar manner, when the second recognition error calculation unit 370 receives an input of a recognition result output from the first image recognition unit 330 and a recognition result output from the second image recognition unit 360, the sum of squares error calculation unit 720 calculates a sum of squares error as an error between the two. Consequently, the second recognition error calculation unit 370 outputs a second recognition error (D2).

Note that, in the description of the example in FIG. 7, the first recognition error calculation unit 340 and the second recognition error calculation unit 370 respectively include the sum of squares error calculation units 710 and 720, and calculate square sum errors and then output a first recognition error (D1) and a second recognition error (D2).

However, the method of outputting the first recognition error (D1) and the second recognition error (D2) by the first recognition error calculation unit 340 and the second recognition error calculation unit 370 is not limited to this. For example, a cross entropy calculation unit may be arranged and a cross entropy may be calculated so that the first recognition error (D1) and the second recognition error (D2) may be output.

(5) Specific Example of Processing by Information Amount Calculation Unit

Figure 8:
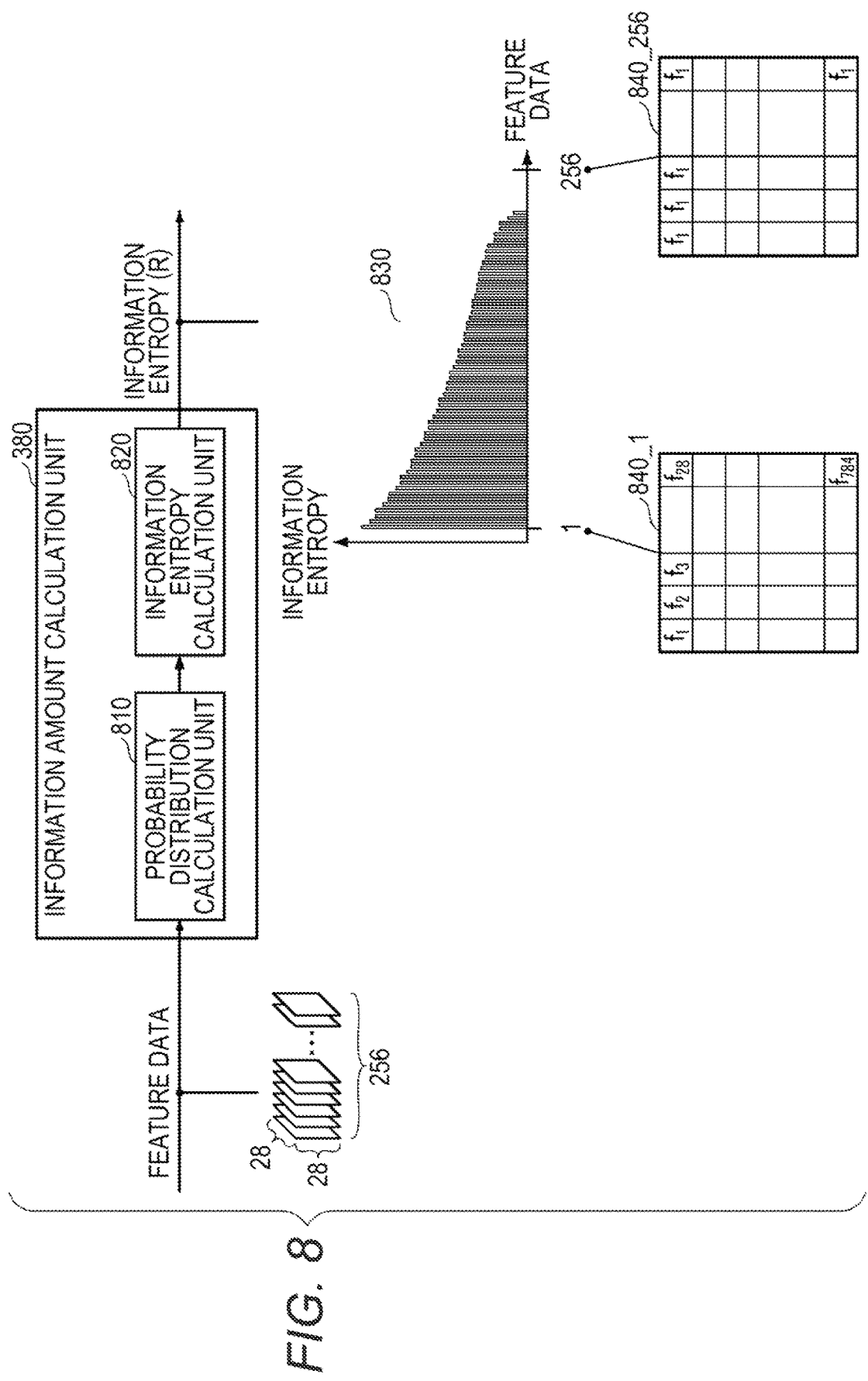
FIG. 8 illustrates a specific example of processing by an information amount calculation unit.

Next, a specific example of processing by the information amount calculation unit 380 will be described. FIG. 8 illustrates a specific example of processing by an information amount calculation unit. As illustrated in FIG. 8, in the first embodiment, the information amount calculation unit 380 includes a probability distribution calculation unit 810 and an information entropy calculation unit 820.

According to the example in FIG. 8, when the information amount calculation unit 380 receives an input of feature data (28×28×256), the probability distribution calculation unit 810 calculates a probability distribution of the feature data, and the information entropy calculation unit 820 calculates information entropy (R) of the probability distribution.

A graph 830 in FIG. 8 is a graph of the information entropy (R) calculated by the information entropy calculation unit 820, in which the horizontal axis represents 256 pieces of feature data, and the vertical axis represents information entropy calculated for each piece of the feature data.

Furthermore, details of feature data having the largest information entropy in the graph 830 are illustrated in feature data 840_1. As illustrated in the feature data 840_1, the feature data having the largest information entropy is feature data constituted by a group of 784 pieces of data in total in which 28 vertical by 28 horizontal pieces of data are arranged, the pieces of data having values that differ from each other (having a larger variance), for example. Note that feature data having larger information entropy is important in the recognition processing.

Furthermore, details of feature data having the smallest information entropy in the graph 830 are illustrated in feature data 840_256. As illustrated in the feature data 840_256, the feature data having the smallest information entropy is feature data constituted by a group of 784 pieces of data in total in which 28 vertical by 28 horizontal pieces of data are arranged, the pieces of data having the same value with each other (having a smaller variance), for example. Feature data having smaller information entropy is not important in the recognition processing.

(6) Specific Example of Processing by Optimization Unit

Figure 9:
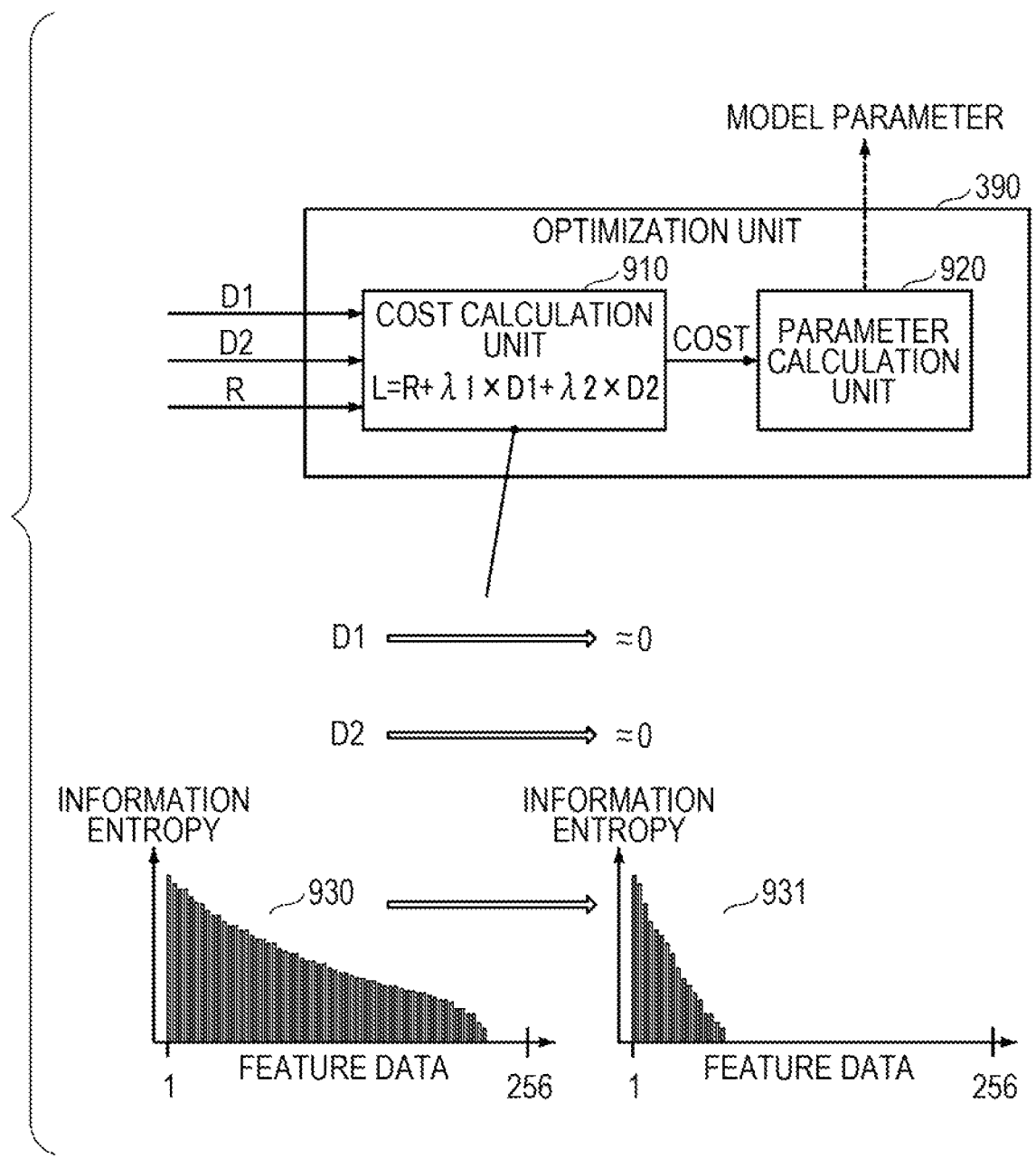
FIG. 9 illustrates a specific example of processing by an optimization unit.

Next, a specific example of processing by the optimization unit 390 will be described. FIG. 9 illustrates a specific example of processing by an optimization unit. As illustrated in FIG. 9, in the first embodiment, the optimization unit 390 includes a cost calculation unit 910 and a parameter calculation unit 920, and optimizes model parameters by applying rate-distortion (RD) theory.

For example, when the optimization unit 390 receives an input of a first recognition error (D1), a second recognition error (D2), and information entropy (R), the cost calculation unit 910 calculates a cost (L) based on the following equation.

$$L = R + \lambda 1 \times D1 + \lambda 2 \times D2 \qquad \text{(Equation 1)}$$

Note that, in the above equation, $\lambda 1$ and $\lambda 2$ are weight coefficients. For example, the cost (L) calculated by the cost calculation unit 910 is a sum obtained by a weighted addition of information entropy (a value related to the amount of feature data), a first recognition error, and a second recognition error.

The parameter calculation unit 920 determines the model parameters of the feature extraction unit 320, the first image recognition unit 330, and the second image recognition unit 360 so as to minimize the cost (L) calculated by the cost calculation unit 910.

The example in FIG. 9 illustrates a situation in which determining the model parameters so as to minimize the cost (L) has caused the first recognition error (D1) to become closer to zero. As described above, by making the first recognition error (D1) smaller and bringing the recognition result closer to the ground truth label, it is possible to maintain substantially the same recognition accuracy as the recognition accuracy in a case where recognition processing has been performed on the image data without being compressed.

Furthermore, the example in FIG. 9 illustrates a situation in which determining the model parameters to minimize the cost (L) has caused the second recognition error (D2) to become closer to zero. As described above, by making the second recognition error (D2) smaller, it is possible to narrow down important feature data (it can be seen from a comparison of the horizontal axis between a graph 930 and a graph 931 that important feature data has been narrowed down).

Moreover, the example in FIG. 9 illustrates a situation in which determining the model parameters to minimize the cost (L) has caused the information entropy (R) to become smaller. As described above, by making the information entropy (R) smaller, it is possible to reduce the amount of feature data (it can be seen from a comparison of the vertical axis between the graph 930 and the graph 931 that the amount of data of each piece of narrowed down feature data has been reduced).

<Flow of Training Processing>

Figure 10:
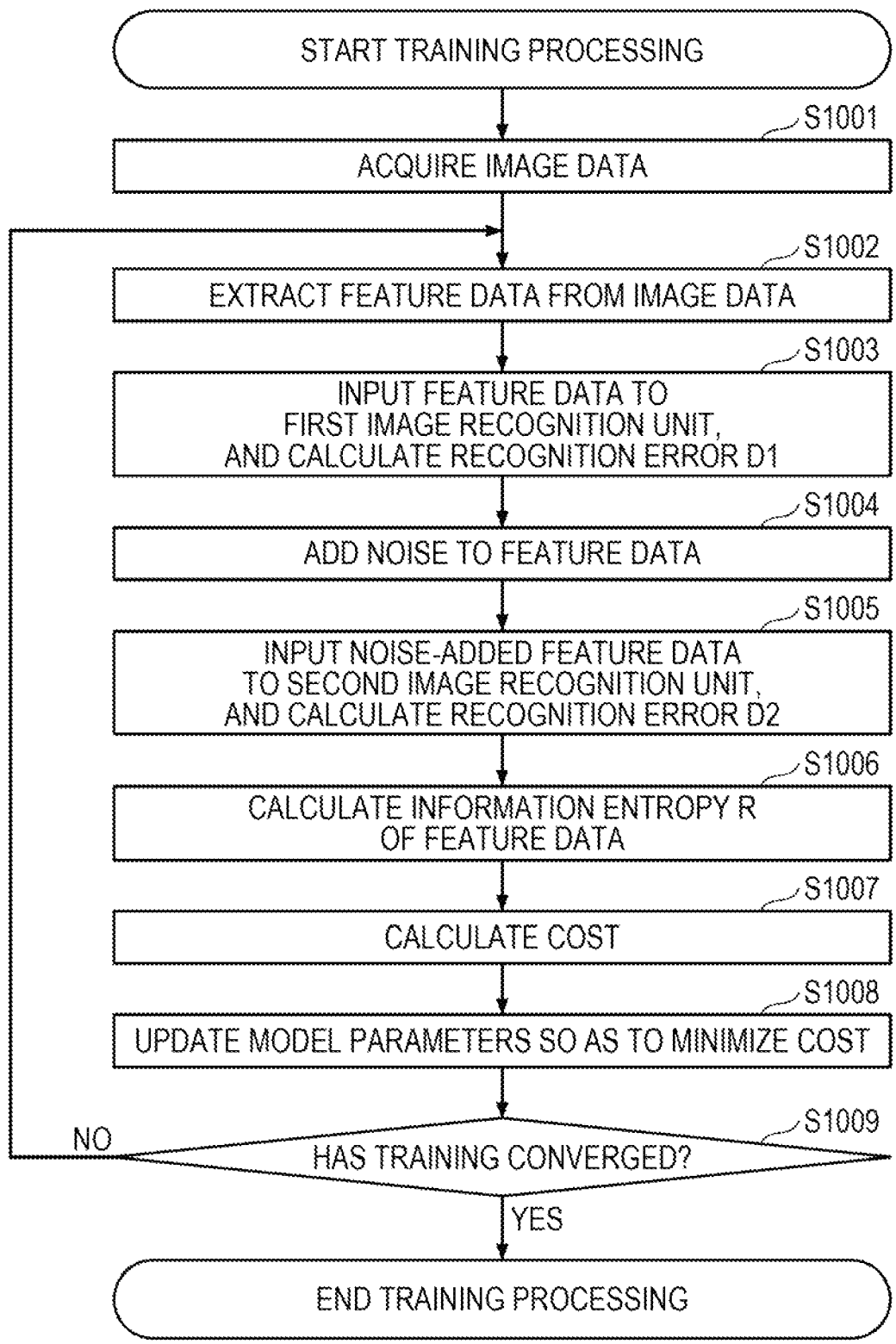
FIG. 10 is a first flowchart illustrating a flow of training processing by the image recognition system.

Next, a flow of training processing by the image recognition system 100 will be described. FIG. 10 is a first flowchart illustrating a flow of training processing by the image recognition system.

In step S1001, the input unit 310 of the training unit 121 acquires image data associated with a ground truth label.

In step S1002, the feature extraction unit 320 of the training unit 121 extracts features from the acquired image data.

In step S1003, the first image recognition unit 330 of the training unit 121 uses the extracted features as inputs, and outputs a recognition result. Furthermore, the first recognition error calculation unit 340 of the training unit 121 calculates the first recognition error (D1) on the basis of the recognition result and the ground truth label.

In step S1004, the noise addition unit 350 of the training unit 121 generates noise-added features by adding noises to the extracted features.

In step S1005, the second image recognition unit 360 of the training unit 121 uses the noise-added features as an input, and outputs a recognition result. Furthermore, the second recognition error calculation unit 370 of the training unit 121 calculates the second recognition error (D2) on the basis of the recognition result output from the second image recognition unit 360 and the recognition result output from the first image recognition unit 330.

In step S1006, the information amount calculation unit 380 of the training unit 121 calculates information entropy (R) of a probability distribution on the basis of the extracted features.

In step S1007, the optimization unit 390 of the training unit 121 calculates a cost (L) using the information entropy (R), the first recognition error (D1), and the second recognition error (D2).

In step S1008, the optimization unit 390 of the training unit 121 updates the model parameters of the feature extraction unit 320, the first image recognition unit 330, and the second image recognition unit 360 so as to minimize the calculated cost (L).

In step S1009, the optimization unit 390 of the training unit 121 determines whether or not the training processing has converged. If it is determined that the training processing has not converged (if No in step S1009), the processing returns to step S1002.

On the other hand, if it is determined in step S1009 that the training processing has converged (if Yes in step S1009), the model parameters of the feature extraction unit 320, the first image recognition unit 330, and the second image recognition unit 360 are determined, and the training processing ends.

<Specific Example of Image Recognition System in Compression and Recognition Phase>

Figure 11:
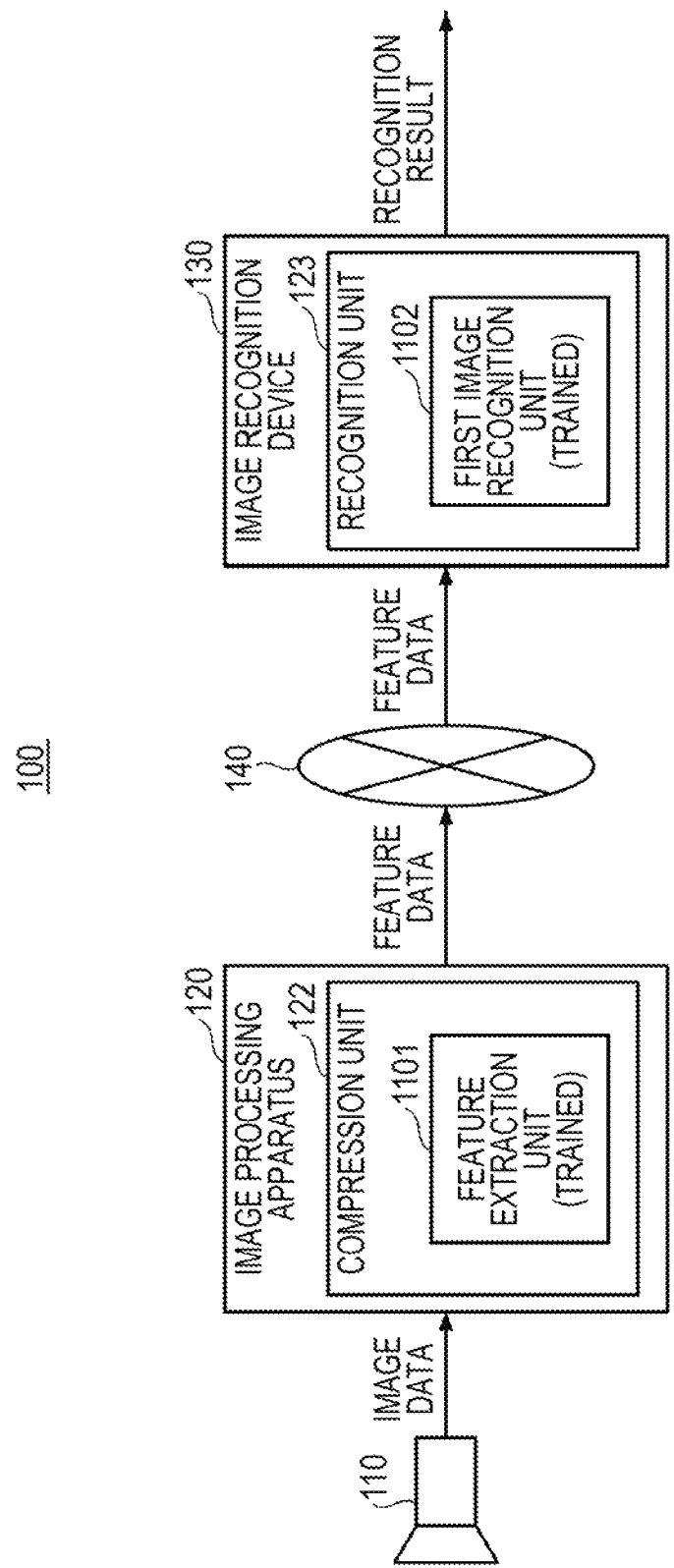
FIG. 11 illustrates a specific example of the system configuration of the image recognition system in a compression and recognition phase.

Next, a specific example of the system configuration of the image recognition system in the compression and recognition phase will be described. FIG. 11 illustrates a specific example of the system configuration of the image recognition system in the compression and recognition phase.

As illustrated in FIG. 11, in the compression and recognition phase, the compression unit 122 of the image processing apparatus 120 includes a trained feature extraction unit 1101, and when image data is input, feature data is output.

The feature data output by the trained feature extraction unit 1101 is minimum feature data that allows the image data recognition accuracy to be maintained.

Furthermore, as illustrated in FIG. 11, in the compression and recognition phase, the recognition unit 123 of the image recognition device 130 includes a trained first image recognition unit 1102, and when feature data is input, a recognition result is output. The recognition result output by the trained first image recognition unit 1102 is substantially equal to a recognition result in a case where recognition processing has been performed on the image data without being compressed. For example, according to the recognition unit 123, it is possible to maintain substantially the same recognition accuracy as the recognition accuracy in a case where recognition processing has been performed on the image data without being compressed.

<Flow of Compression and Recognition Processing>

Figure 12:
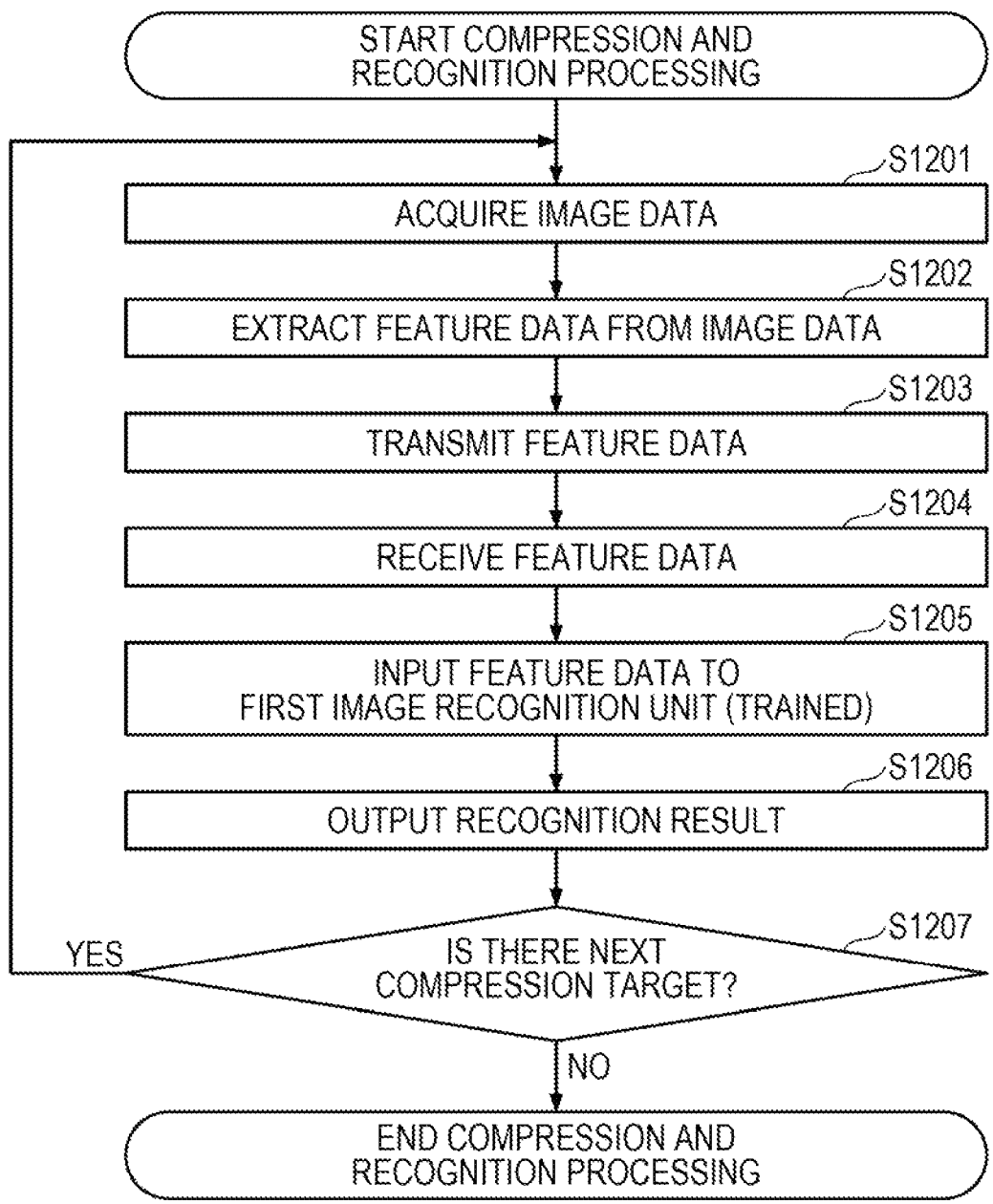
FIG. 12 is a first flowchart illustrating a flow of compression and recognition processing by the image recognition system.

Next, a flow of compression and recognition processing by the image recognition system 100 will be described. FIG. 12 is a first flowchart illustrating a flow of compression and recognition processing by the image recognition system.

In step S1201, the compression unit 122 of the image processing apparatus 120 acquires image data from the image pickup device 110.

In step S1202, the trained feature extraction unit 1101 included in the compression unit 122 of the image processing apparatus 120 extracts feature data from the acquired image data.

In step S1203, the compression unit 122 of the image processing apparatus 120 transmits the extracted feature data to the image recognition device 130.

In step S1204, the recognition unit 123 of the image recognition device 130 receives the feature data.

In step S1205, the trained first image recognition unit 1102 included in the recognition unit 123 of the image recognition device 130 performs recognition processing by using the received feature data as an input.

In step S1206, the trained first image recognition unit 1102 included in the recognition unit 123 of the image recognition device 130 outputs a recognition result.

In step S1207, the compression unit 122 of the image processing apparatus 120 determines whether there is next image data (compression target). If it is determined in step S1207 that there is next image data (if Yes in step S1207), the processing returns to step S1201.

On the other hand, if it is determined in step S1207 that there is no next image data (if No in step S1207), the compression and recognition processing ends.

As is clear from the above description, the image processing apparatus according to the first embodiment calculates a first recognition error, which is an error between ground truth data related to training data and a recognition result output from the first image recognition unit when feature data is input.

Furthermore, the image processing apparatus according to the first embodiment calculates a second recognition error, which is an error between a recognition result output from the second image recognition unit when noise-added feature data obtained by adding noise to feature data is input and the recognition result output from the first image recognition unit.

Moreover, the image processing apparatus according to the first embodiment determines model parameters of the feature extraction unit and the first and second image recognition units so as to minimize a cost obtained by a weighted addition of information entropy, which is a value related to the amount of feature data, and the first and second recognition errors.

In this way, by executing the training processing so as to minimize the cost, according to the first embodiment, it is possible to reduce the amount of image data while maintaining the recognition accuracy in the image recognition processing.

Second Embodiment

In the first embodiment described above, a case has been described in which model parameters of each unit are collectively determined so as to minimize the cost during the training processing. On the other hand, in a second embodiment, a case will be described in which an autoencoder unit is newly arranged and the model parameters of each unit are sequentially determined during the training processing.

Note that, according to the second embodiment, arranging the autoencoder unit makes it possible to reuse an existing trained feature extraction unit and image recognition unit, and sequentially determine the model parameters, and thus training efficiency may be improved. The second embodiment will be described below focusing on differences from the first embodiment described above.

<Functional Configuration of Training Unit of Image Processing Apparatus>

Figures 13, 13A:
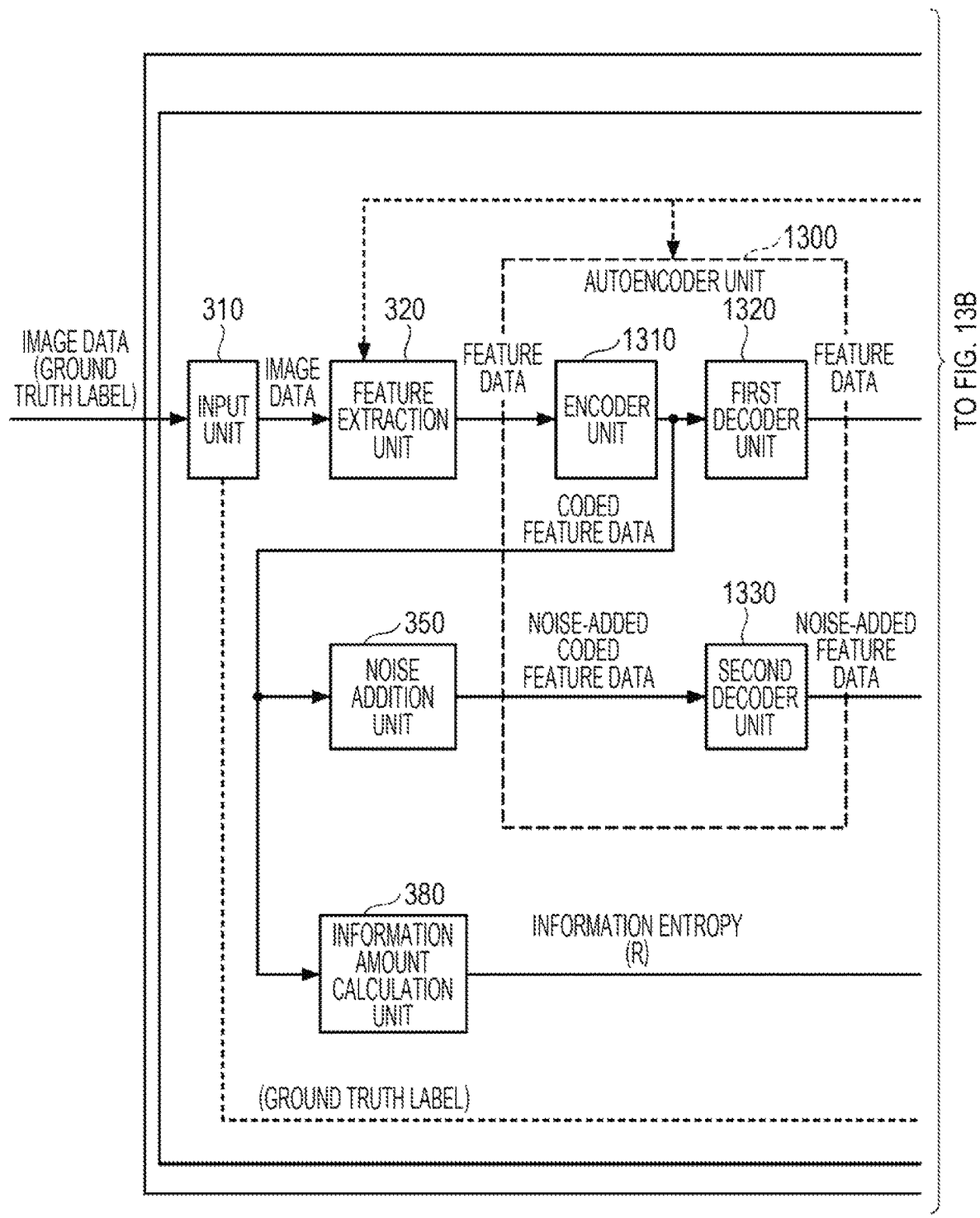
FIGS. 13A and 13B are a second diagram illustrating an example of a functional configuration of a training unit of an image processing apparatus.
Figure 13B:
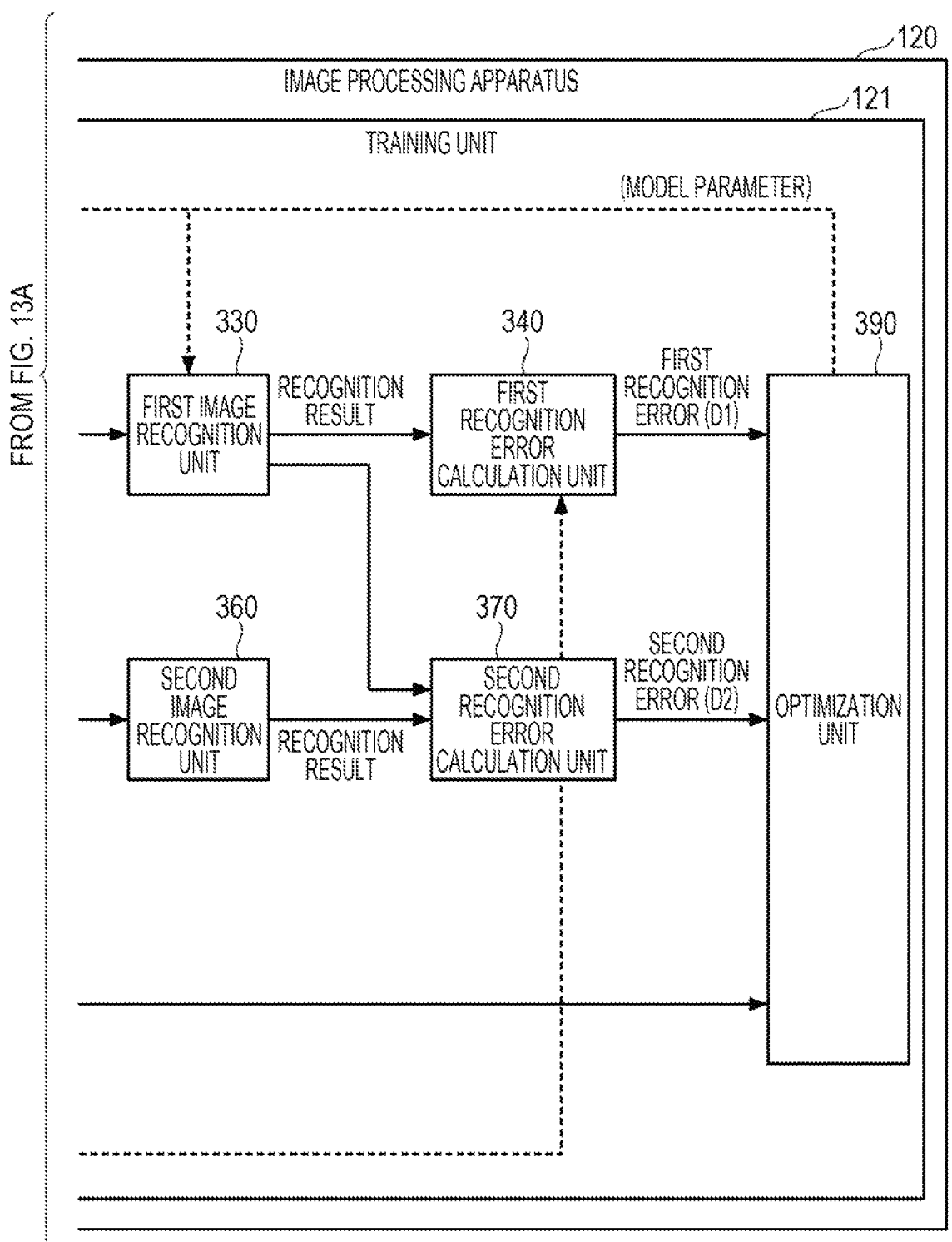

First, a functional configuration of a training unit 121 of an image processing apparatus 120 in the second embodiment will be described. FIGS. 13A and 13B are a second diagram illustrating an example of a functional configuration of a training unit of an image processing apparatus. The difference from the functional configuration illustrated in FIGS. 3A and 3B is that an autoencoder unit 1300 (see a broken line frame) is included in the case of FIGS. 13A and 13B. As illustrated in FIGS. 13A and 13B, the autoencoder unit 1300 includes an encoder unit 1310, a first decoder unit 1320, and a second decoder unit 1330.

The encoder unit 1310, which is an FC-based model, encodes feature data to generate coded feature data. Note that model parameters of the encoder unit 1310 are determined by an optimization unit 390.

The first decoder unit 1320, which is an FC-based model, decodes the coded feature data generated by the encoder unit 1310. Note that model parameters of the first decoder unit 1320 are determined by the optimization unit 390.

The second decoder unit 1330, which is an FC-based model, decodes noise-added coded feature data, which is coded feature data after addition of noise obtained by encoding by the encoder unit 1310 and addition of noise by a noise addition unit 350. Note that model parameters of the second decoder unit 1330 are determined by the optimization unit 390.

Arranging the autoencoder unit 1300 in this way allows the training unit 121 to sequentially determine the model parameters by the following steps. —Step 1: Determine model parameters of a feature extraction unit and an image recognition unit The model parameters of a feature extraction unit 320 and the image recognition unit are determined so as to minimize a first recognition error (D1) in a case where an image recognition unit (for example, a first image recognition unit 330) performs recognition processing by using, as an input, feature data output from the feature extraction unit 320.

However, in a case where an trained feature extraction unit and image recognition unit are reused, the processing of step 1 becomes unnecessary. The trained feature extraction unit and image recognition unit are, for example, a feature extraction unit and an image recognition unit of a trained model that has been trained in advance with use of a predetermined image data set, such as VGG16 or VGG19.

Note that the determined model parameters of the feature extraction unit 320 are set in the feature extraction unit 320. Furthermore, the determined model parameters of the image recognition unit are set in each of the first image recognition unit 330 and a second image recognition unit 360 (for example, in the present embodiment, a trained first image recognition unit and a trained second image recognition unit are the same unit).—Step 2: Determine model parameters of an autoencoder unit Training processing of the autoencoder unit 1300 is executed with use of a trained feature extraction unit, a trained first image recognition unit, and a trained second image recognition unit, and model parameters of the autoencoder unit 1300 are determined so as to minimize a cost (L).

Consequently, the second embodiment allows for an improvement in training efficiency by the training unit 121.

<Specific Example of Processing by Autoencoder Unit>

Figures 14, 14A:
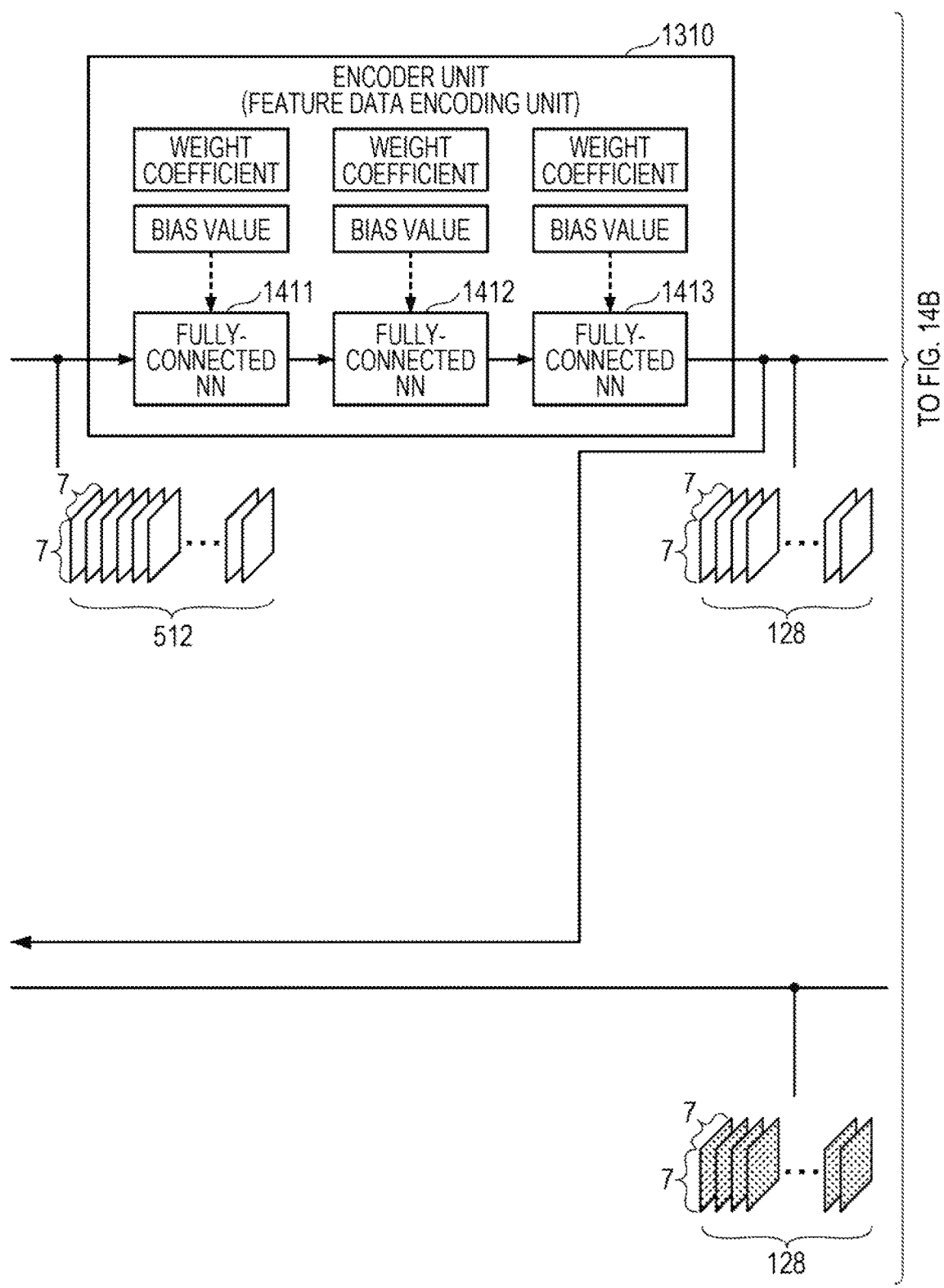
FIGS. 14A and 14B illustrate a specific example of processing by an autoencoder unit.
Figure 14B:
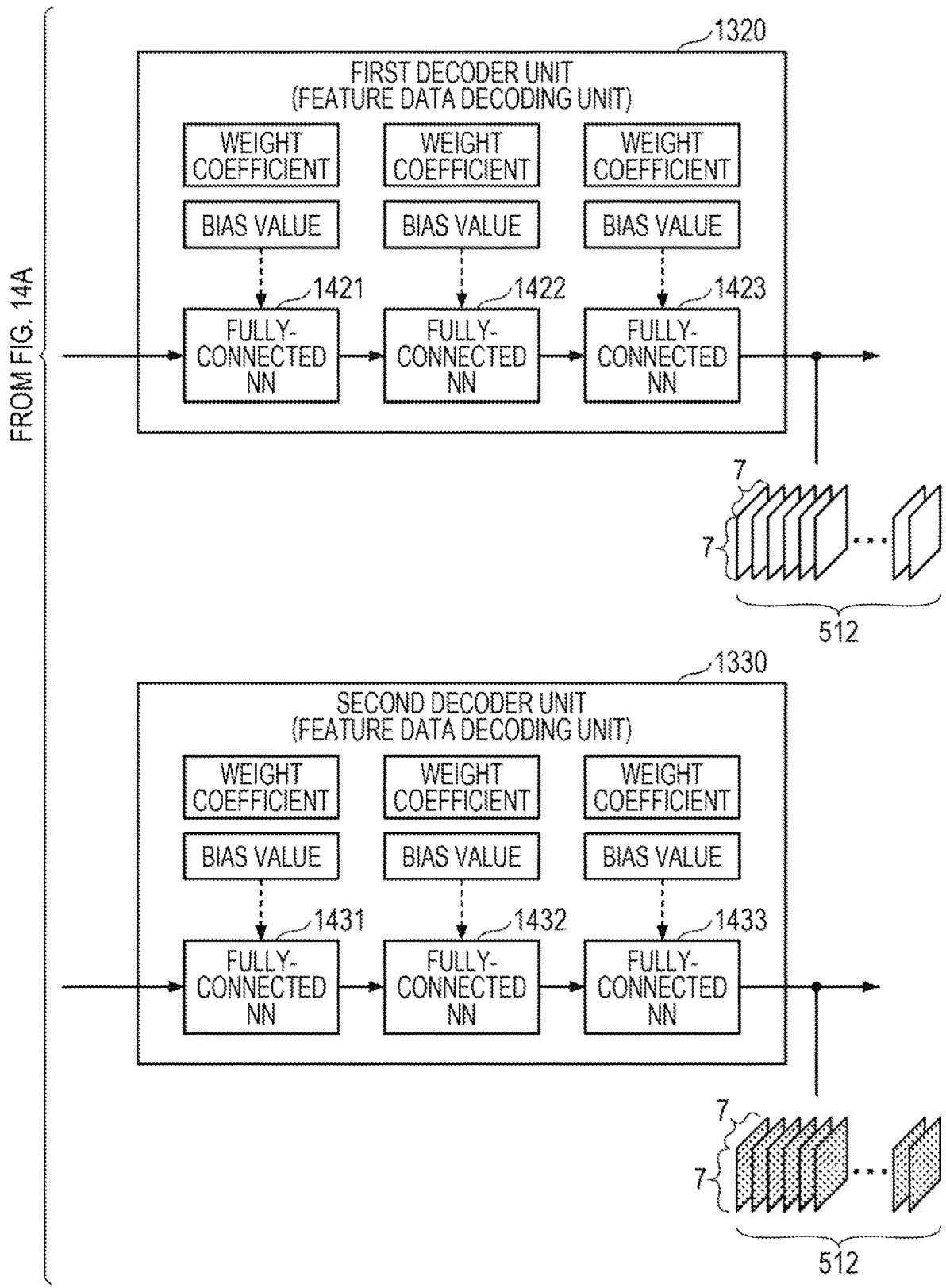

Next, a specific example of processing by the autoencoder unit 1300 will be described. FIGS. 14A and 14B illustrate a specific example of processing by the autoencoder unit. As illustrated in FIGS. 14A and 14B, in the second embodiment, the autoencoder unit 1300 includes: the encoder unit 1310 including fully-connected NNs 1411 to 1413; the first decoder unit 1320 including fully-connected NNs 1421 to 1423; and the second decoder unit 1330 including fully-connected NNs 1431 to 1433.

According to the example in FIGS. 14A and 14B, feature data (7×7×512) output from a trained feature extraction unit is input to the encoder unit 1310. When the feature data (7×7×512) is input, the encoder unit 1310 encodes the feature data (7×7×512), and outputs coded feature data (7×7×128).

Furthermore, the coded feature data (7×7×128) output from the encoder unit 1310 is input to the first decoder unit 1320. When the coded feature data (7×7×128) is input, the first decoder unit 1320 decodes the coded feature data (7×7×128), and outputs feature data (7×7×512).

Furthermore, the coded feature data (7×7×128) output from the encoder unit 1310 is input to the second decoder unit 1330 after noise has been added to the coded feature data by the noise addition unit 350 (not illustrated in FIGS. 14A and 14B). When the noise-added coded feature data (7×7×128) is input, the second decoder unit 1330 decodes the noise-added coded feature data (7×7×128), and outputs noise-added feature data (7×7×512).

<Flow of Training Processing>

Figure 15:
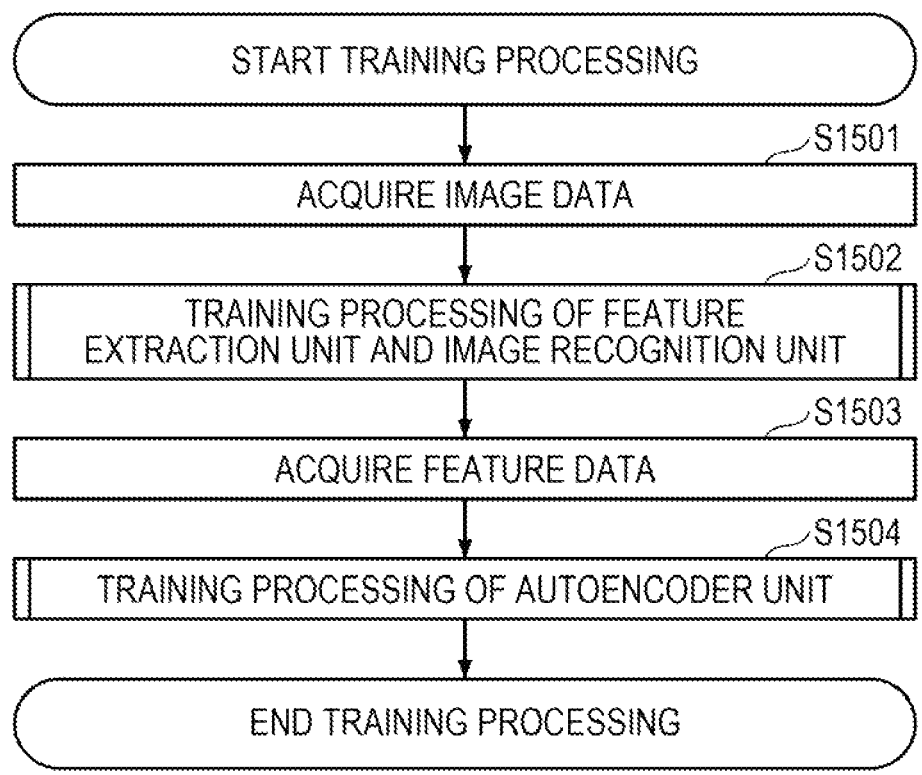
FIG. 15 is a second flowchart illustrating a flow of training processing by an image recognition system.

Next, a flow of training processing by an image recognition system 100 will be described. FIG. 15 is a second flowchart illustrating a flow of training processing by an image recognition system.

In step S1501, an input unit 310 of the training unit 121 acquires image data associated with a ground truth label.

In step S1502, the training unit 121 executes training processing on the feature extraction unit 320 and an image recognition unit (for example, the first image recognition unit 330) by using the image data associated with the ground truth label. Consequently, the training unit 121 generates a trained feature extraction unit, a trained first image recognition unit, and a trained second image recognition unit. Note that details of the training processing of the feature extraction unit and the image recognition unit will be described later.

In step S1503, the training unit 121 acquires feature data extracted by the trained feature extraction unit.

In step S1504, the training unit 121 uses the acquired feature data to execute training processing on the autoencoder unit 1300. Consequently, the training unit 121 generates a trained encoder unit. Note that details of the training processing of the autoencoder unit will be described later.

<Details of Each Step of Training Processing>

Next, among the steps of the training processing illustrated in FIG. 15, details of: training processing of the feature extraction unit and the image recognition unit (step S1502); and the training processing of the autoencoder unit 1300 (step S1504) will be described.

Figure 16A:
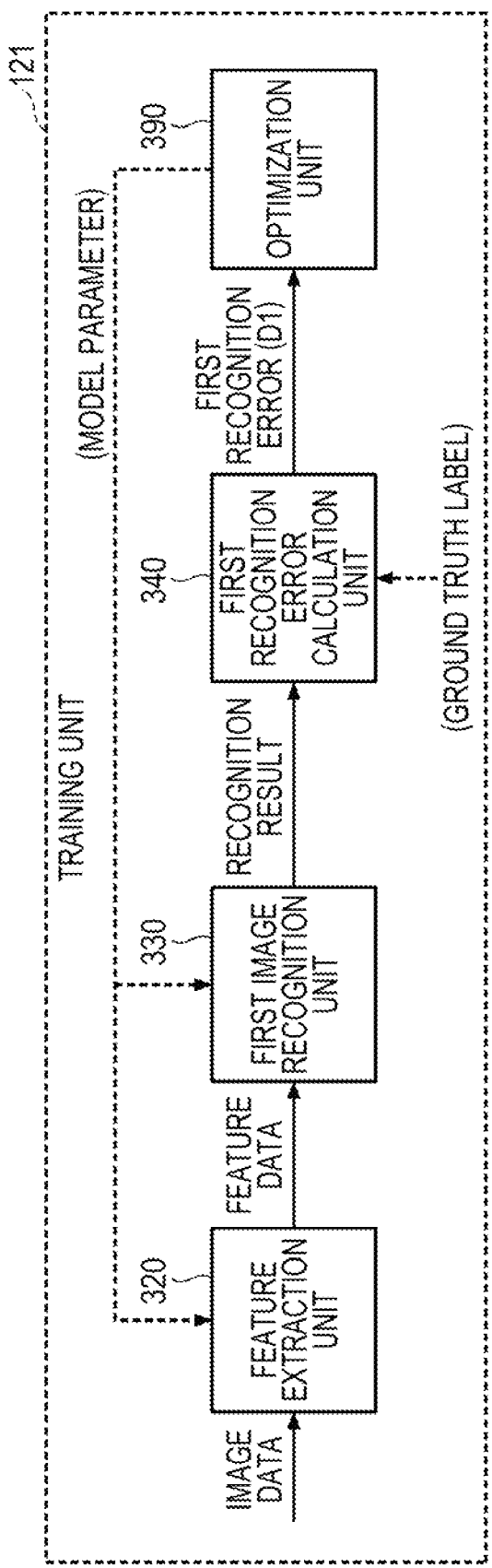
FIGS. 16A and 16B illustrate the functional configuration of the training unit at the time of training processing of a feature extraction unit and an image recognition unit, and a flowchart illustrating a flow of the training processing of the feature extraction unit and the image recognition unit.
Figure 16B:
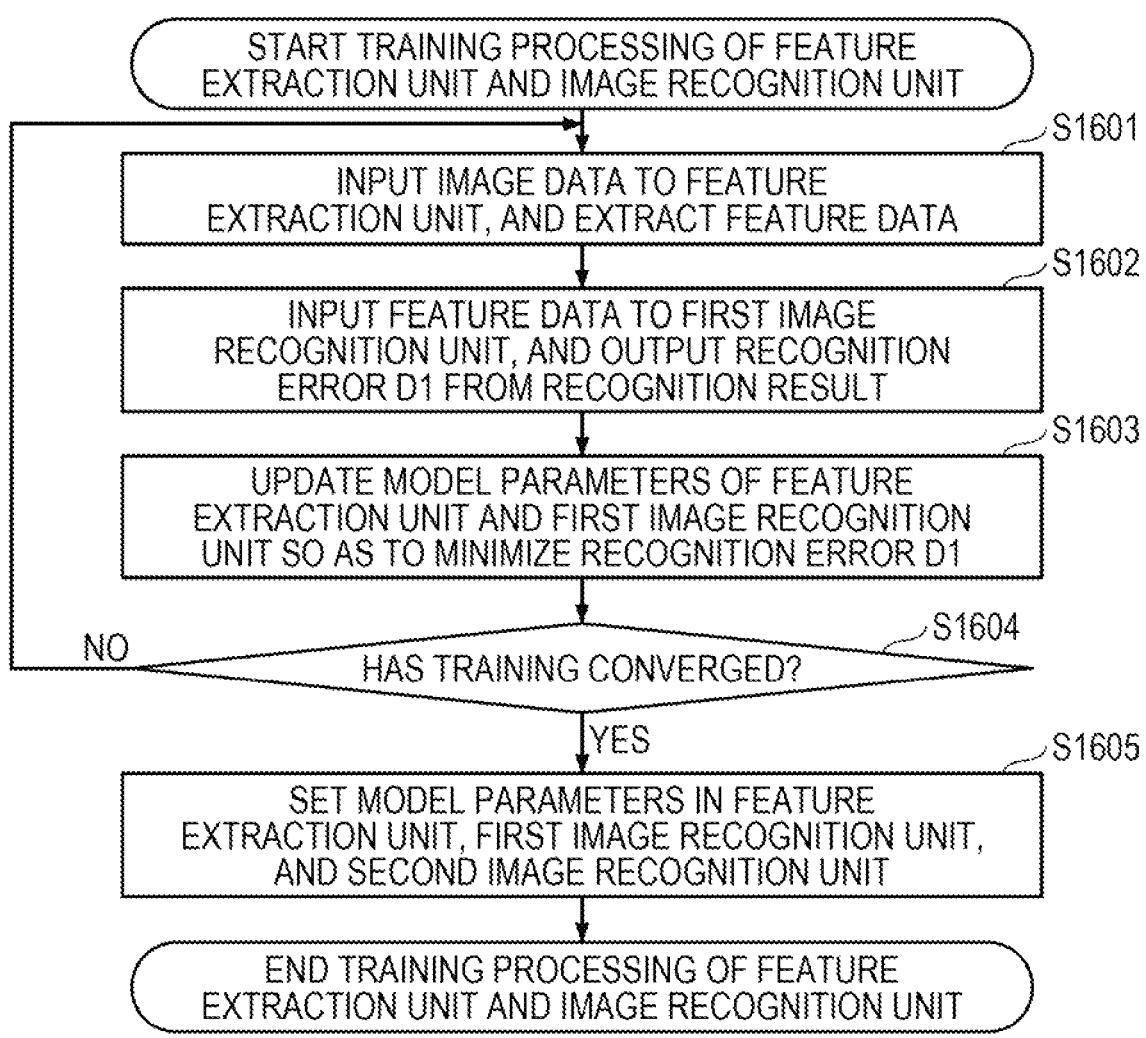

(1) Details of Training Processing of Feature Extraction Unit and Image Recognition Unit First, the details of the training processing (step S1502 in FIG. 15) of the feature extraction unit and the image recognition unit will be described with reference to FIGS. 16A and 16B. FIGS. 16A and 16B illustrate the functional configuration of the training unit at the time of training processing of a feature extraction unit and an image recognition unit, and a flowchart illustrating a flow of the training processing of the feature extraction unit and the image recognition unit.

As illustrated in FIG. 16A, at the time of training processing of the feature extraction unit and the image recognition unit, among the units in the training unit 121, the feature extraction unit 320, the first image recognition unit 330, a first recognition error calculation unit 340, and the optimization unit 390 operate.

For example, as illustrated in FIG. 16B, in step S1601, the feature extraction unit 320 extracts feature data from image data.

In step S1602, the first image recognition unit 330 performs recognition processing by using the extracted feature data as an input, and outputs a recognition result. Furthermore, the first recognition error calculation unit 340 compares the recognition result output from the first image recognition unit 330 with a ground truth label associated with the image data, and outputs the first recognition error (D1).

In step S1603, the optimization unit 390 updates the model parameters of the feature extraction unit 320 and the first image recognition unit 330 so as to minimize the first recognition error (D).

In step S1604, the optimization unit 390 determines whether or not the training processing has converged. If it is determined that the training processing has not converged (if No in step S1604), the processing returns to step S1601.

On the other hand, if it is determined in step S1604 that the training processing has converged (if Yes in step S1604), the model parameters of the feature extraction unit 320 and the first image recognition unit 330 are determined, and the processing proceeds to step S1605.

In step S1605, the training unit 121 sets the model parameters of the determined feature extraction unit 320 in the feature extraction unit 320. Furthermore, the training unit 121 sets the determined model parameters of the first image recognition unit 330 in each of the first image recognition unit 330 and the second image recognition unit 360. Consequently, the training unit 121 ends the training processing of the feature extraction unit and the image recognition unit. As a result, a trained feature extraction unit, a trained first image recognition unit, and a trained second image recognition unit are generated (as described above, in the present embodiment, the trained first image recognition unit and the trained second image recognition unit are the same unit).

(2) Details of Training Processing of Autoencoder Unit

Figure 17B:
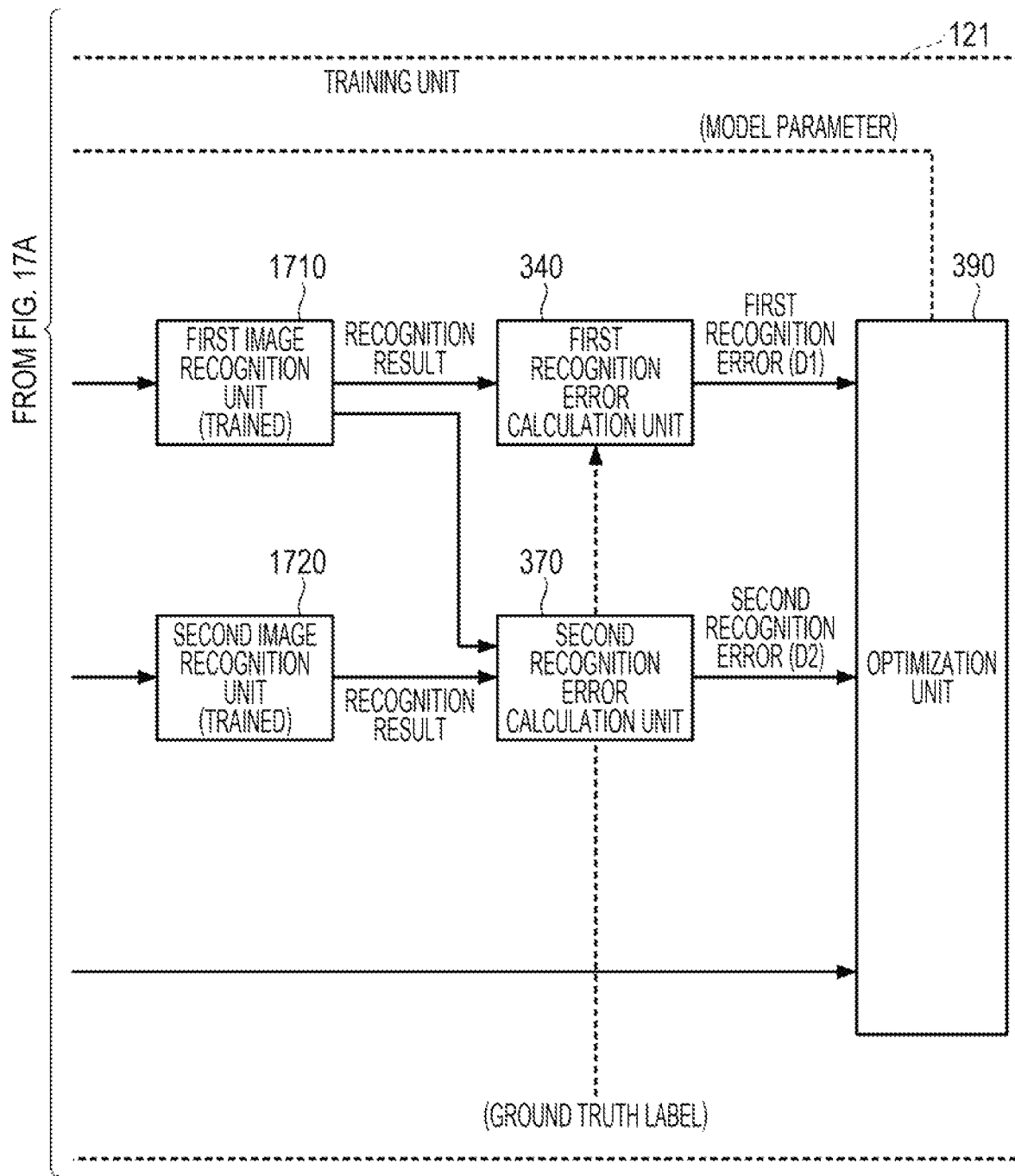

Next, details of the training processing of the autoencoder unit 1300 (step S1504 in FIG. 15) will be described with reference to FIGS. 17A and 17B and 18. FIGS. 17A and 17B illustrate an example of the functional configuration of the training unit at the time of training processing of the autoencoder unit. Furthermore, FIG. 18 is a flowchart illustrating a flow of the training processing of the autoencoder unit.

As illustrated in FIGS. 17A and 17B, at the time of training processing of the autoencoder unit 1300, among the units in the training unit 121, a trained feature extraction unit 1700, the autoencoder unit 1300, and trained first and second image recognition units 1710 and 1720 operate. Furthermore, at the time of training processing of the autoencoder unit 1300, the first recognition error calculation unit 340, a second recognition error calculation unit 370, the noise addition unit 350, an information amount calculation unit 380, and the optimization unit 390 operate.

Figure 18:
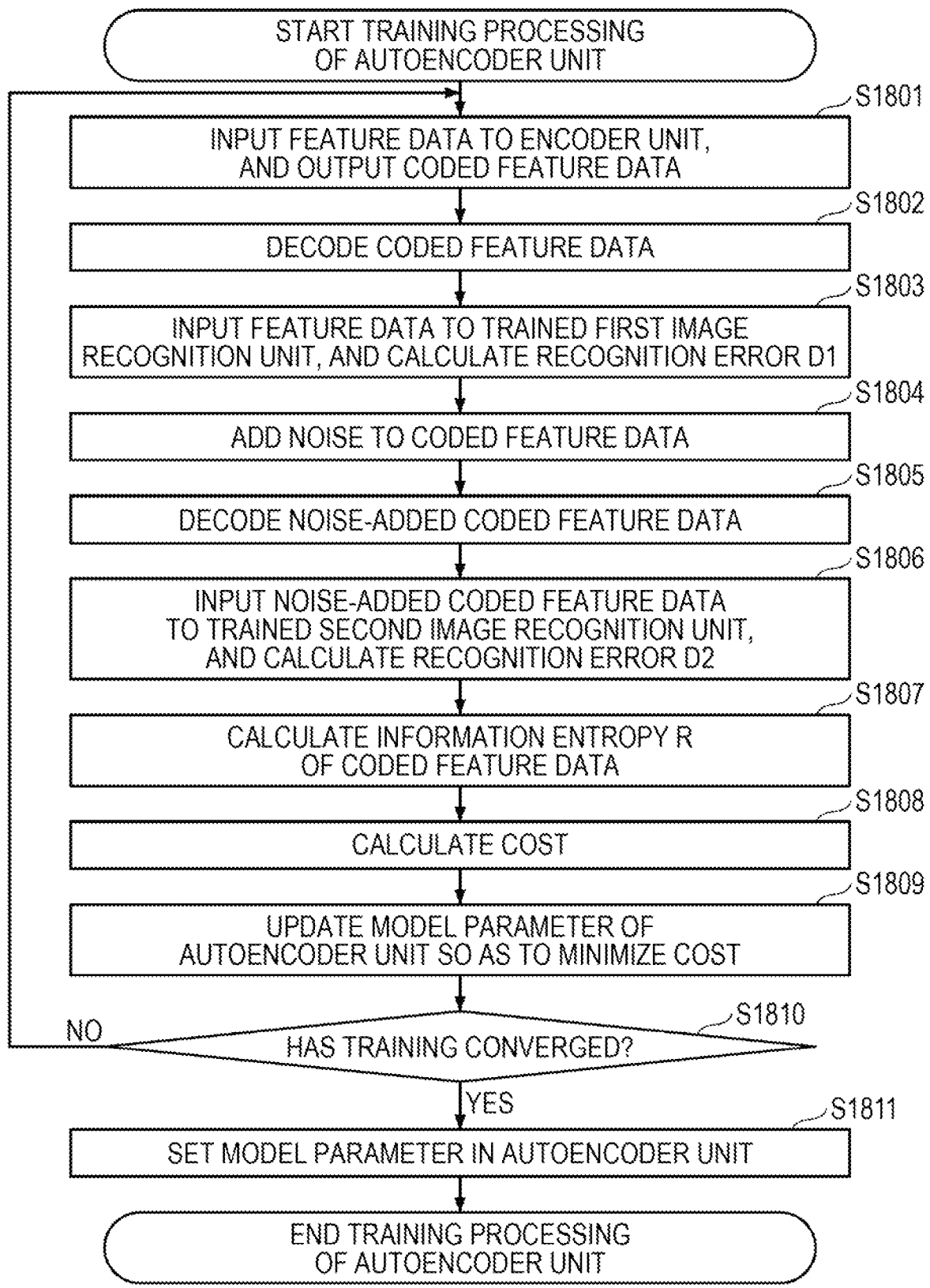
FIG. 18 is a flowchart illustrating a flow of the training processing of the autoencoder unit.

For example, as illustrated in FIG. 18, in step S1801, the encoder unit 1310 of the autoencoder unit 1300 performs encoding processing by using feature data as an input, and outputs coded feature data.

In step S1802, the first decoder unit 1320 of the autoencoder unit 1300 decodes the coded feature data output from the encoder unit 1310.

In step S1803, the trained first image recognition unit 1710 performs recognition processing by using, as an input, the feature data decoded by the first decoder unit 1320, and outputs a recognition result. Furthermore, the first recognition error calculation unit 340 compares the recognition result output from the trained first image recognition unit 1710 with a ground truth label associated with image data, and outputs the first recognition error (D1).

In step S1804, the noise addition unit 350 adds noise to the coded feature data output from the encoder unit 1310, and outputs noise-added coded feature data.

In step S1805, the second decoder unit 1330 of the autoencoder unit 1300 decodes the noise-added coded feature data output from the noise addition unit 350.

In step S1806, the trained second image recognition unit 1720 performs recognition processing by using, as an input, the noise-added feature data decoded by the second decoder unit 1330, and outputs a recognition result. Furthermore, the second recognition error calculation unit 370 compares the recognition result output from the trained second image recognition unit 1720 with the recognition result output from the trained first image recognition unit 1710, and outputs a second recognition error (D2).

In step S1807, the information amount calculation unit 380 calculates information entropy (R) of a probability distribution on the basis of the coded feature data output from the encoder unit 1310.

In step S1808, the optimization unit 390 calculates a cost (L) using the information entropy (R), the first recognition error (D), and the second recognition error (D2).

In step S1809, the optimization unit 390 updates the model parameters of the autoencoder unit 1300 so as to minimize the calculated cost (L).

In step S1810, the optimization unit 390 determines whether or not the training processing has converged, and if it is determined that the training processing has not converged (if No in step S1810), the processing returns to step S1801.

On the other hand, if it is determined in step S1810 that the training processing has converged (if Yes in step S1810), parameters of the autoencoder unit 1300 are determined, and the processing proceeds to step S1811.

In step S1811, the training unit 121 sets the determined model parameters of the autoencoder unit 1300, and ends the training processing of the autoencoder unit. For example, the determined model parameters of the encoder unit 1310 are set in the encoder unit 1310, and the determined model parameters of the first decoder unit 1320 are set in the first decoder unit 1320. Consequently, a trained encoder unit and a trained first decoder unit are generated.

<Specific Example of Image Recognition System in Compression and Recognition Phase>

Figure 19:
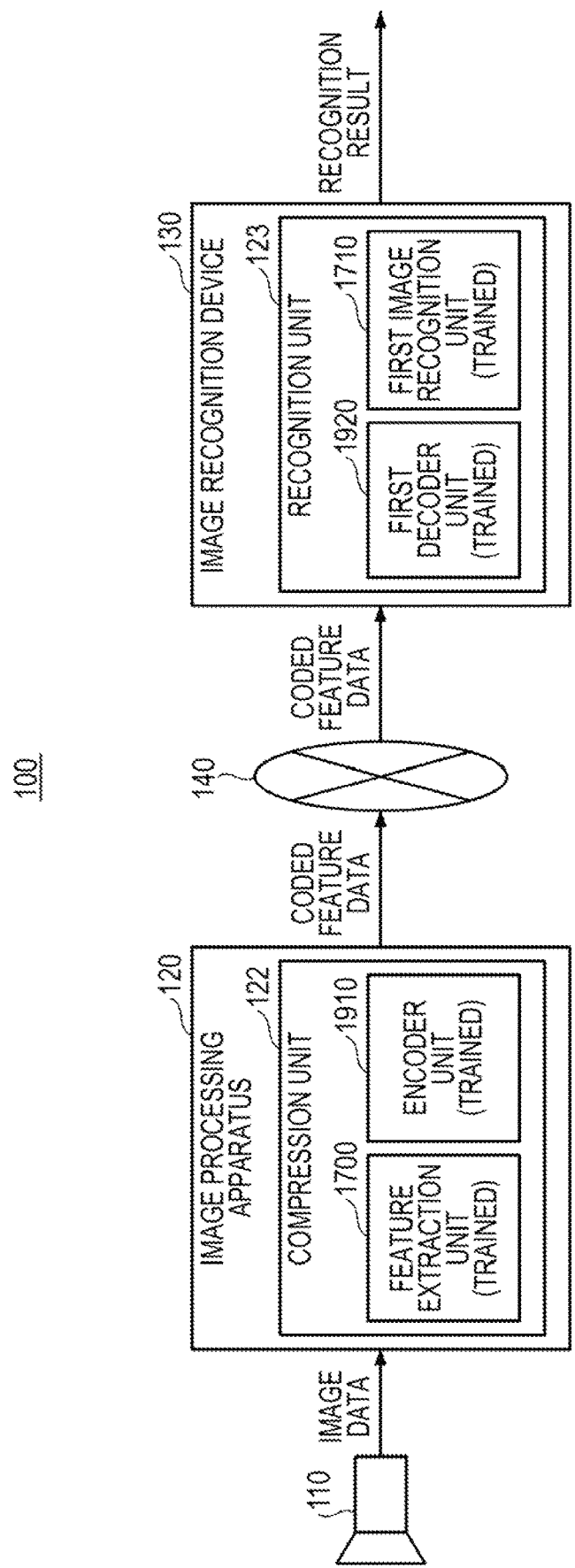
FIG. 19 is a second diagram illustrating an example of a system configuration of the image recognition system in a compression and recognition phase.

Next, a specific example of a system configuration of the image recognition system in a compression and recognition phase will be described. FIG. 19 is a second diagram illustrating an example of the system configuration of the image recognition system in the compression and recognition phase.

As illustrated in FIG. 19, in the compression and recognition phase, a compression unit 122 of the image processing apparatus 120 includes the trained feature extraction unit 1700 and a trained encoder unit 1910.

When the compression unit 122 of the image processing apparatus 120 receives an input of image data, the trained feature extraction unit 1700 outputs feature data.

Furthermore, the trained encoder unit 1910 encodes the feature data output from the trained feature extraction unit 1700 to generate the coded feature data. Moreover, the compression unit 122 transmits the coded feature data generated by the trained encoder unit 1910 to an image recognition device 130 via a network 140. Note that the coded feature data transmitted by the compression unit 122 is minimum coded feature data that allows the image data recognition accuracy to be maintained.

Furthermore, as illustrated in FIG. 19, in the compression and recognition phase, a recognition unit 123 of the image recognition device 130 includes a trained first decoder unit 1920 and the trained first image recognition unit 1710.

When the recognition unit 123 of the image recognition device 130 receives coded feature data, the trained first decoder unit 1920 decodes the coded feature data, and outputs feature data.

Furthermore, when the feature data output from the trained first decoder unit 1920 is input, the trained first image recognition unit 1710 outputs a recognition result. The recognition result output by the trained first image recognition unit 1710 is substantially equal to a recognition result in a case where recognition processing has been performed on the image data without being compressed. For example, according to the recognition unit 123, it is possible to maintain substantially the same recognition accuracy as the recognition accuracy in a case where recognition processing has been performed on the image data without being compressed.

<Flow of Compression and Recognition Processing>

Figure 20:
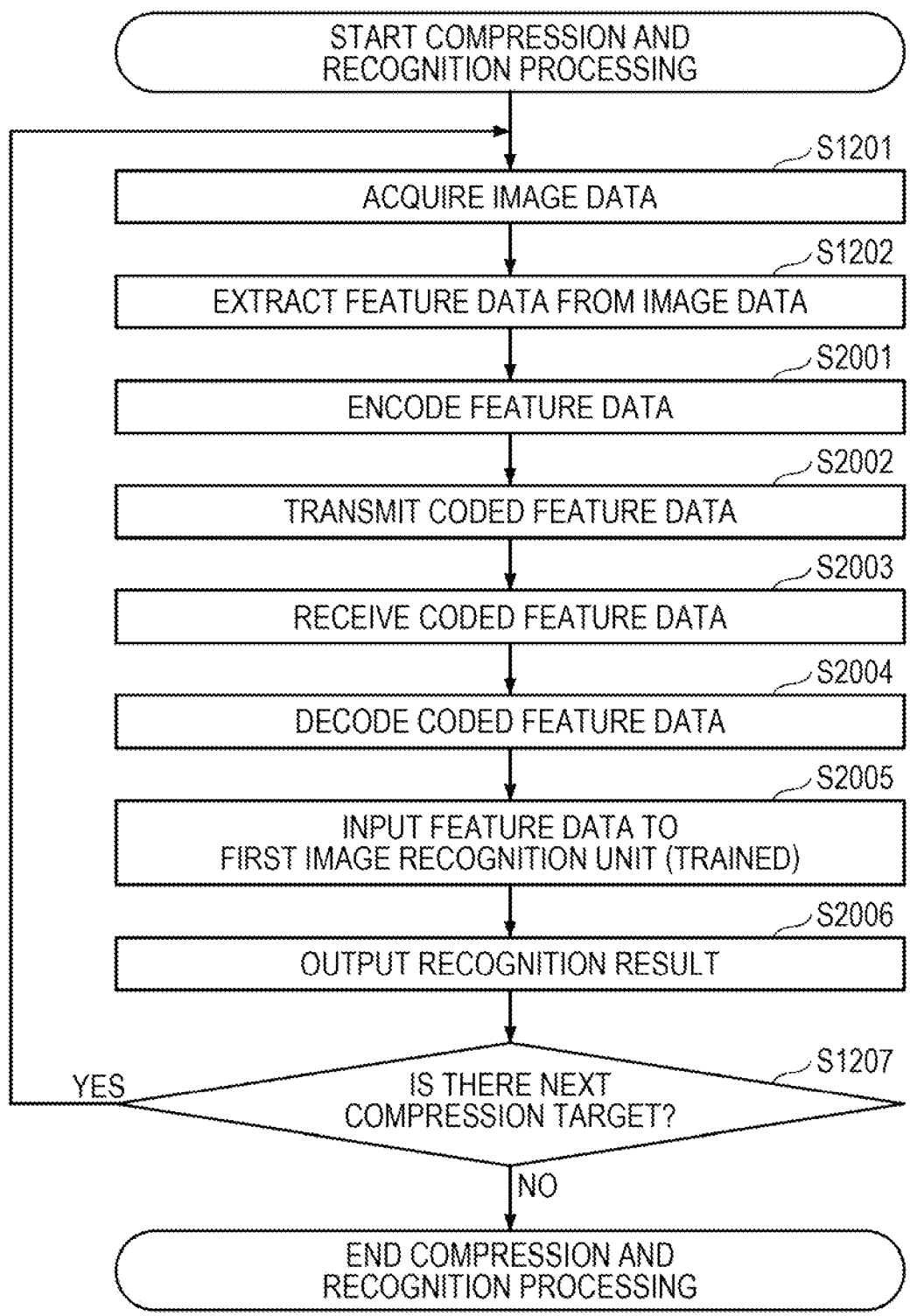
FIG. 20 is a second flowchart illustrating a flow of compression and recognition processing by the image recognition system.

Next, a flow of compression and recognition processing by the image recognition system 100 will be described. FIG. 20 is a second flowchart illustrating a flow of compression and recognition processing by the image recognition system. Note that, among the steps of the compression and recognition processing illustrated in FIG. 20, the differences from FIG. 12 are steps S2001 to 2006.

In step S2001, the trained encoder unit 1910 included in the compression unit 122 of the image processing apparatus 120 encodes the feature data extracted by the trained feature extraction unit 1700 to generate coded feature data.

In step S2002, the compression unit 122 of the image processing apparatus 120 transmits the coded feature data to the image recognition device 130.

In step S2003, the recognition unit 123 of the image recognition device 130 receives the coded feature data.

In step S2004, the trained first decoder unit 1920 included in the recognition unit 123 of the image recognition device 130 decodes the received coded feature data, and outputs feature data.

In step S2005, the trained first image recognition unit 1710 included in the recognition unit 123 of the image recognition device 130 performs recognition processing by using the feature data as an input.

In step S2006, the trained first image recognition unit 1710 included in the recognition unit 123 of the image recognition device 130 outputs a recognition result.

As is clear from the above description, the image processing apparatus according to the second embodiment receives an input of feature data extracted from the feature extraction unit, and then calculates a first recognition error, which is an error between ground truth data and a recognition result output from the first image recognition unit. Furthermore, the image processing apparatus according to the second embodiment determines the model parameters of the feature extraction unit and the first image recognition unit so as to minimize the calculated first recognition error, and makes the feature extraction unit and the first image recognition unit trained. Furthermore, the image processing apparatus according to the second embodiment sets the same model parameters as those of the trained first image recognition unit to the second image recognition unit.

Furthermore, the image processing apparatus according to the second embodiment inputs, to the trained first image recognition unit, feature data that has been extracted by the trained feature extraction unit and then encoded and decoded by the autoencoder unit. Furthermore, the image processing apparatus according to the second embodiment calculates a first recognition error, which is an error between ground truth data and a recognition result output from the trained first image recognition unit. Furthermore, the image processing apparatus according to the second embodiment inputs, to the trained second image recognition unit, noise-added feature data obtained by adding noise to coded feature data encoded by the autoencoder unit and then decoding the data. Furthermore, the image processing apparatus according to the second embodiment calculates a second recognition error, which is an error between a recognition result output from the trained second image recognition unit and a recognition result output from the trained first image recognition unit.

Moreover, the image processing apparatus according to the second embodiment determine the model parameters of the autoencoder unit so as to minimize a cost obtained by a weighted addition of information entropy of the coded feature data and the first and second recognition errors.

In this way, by executing the training processing so as to minimize the cost, according to the second embodiment, it is possible to reduce the amount of image data while maintaining the recognition accuracy in the image recognition processing. In addition, according to the second embodiment, it is possible to reuse an existing trained feature extraction unit and image recognition unit, and sequentially determine the model parameters, and thus the training efficiency may be improved.

Third Embodiment

In the description of the second embodiment described above, in the compression and recognition phase, the trained first decoder unit 1920 is arranged in the image recognition device 130, and coded feature data transmitted from the image processing apparatus 120 is decoded.

On the other hand, in a third embodiment, in a compression and recognition phase, a trained first decoder unit 1920 is not arranged in an image recognition device 130, and a trained first image recognition unit directly performs recognition processing by using coded feature data as an input. The third embodiment will be described below focusing on differences from the second embodiment described above.

<Functional Configuration of Training Unit of Image Processing Apparatus>

First, a functional configuration of a training unit 121 of an image processing apparatus 120 in the third embodiment will be described. Note that the functional configuration of the training unit 121 of the image processing apparatus 120 in the third embodiment is basically the same as the functional configuration of the training unit 121 of the image processing apparatus 120 in the second embodiment. However, in the case of the third embodiment, the training unit 121 determines model parameters by the following steps.—
Step 1: Determine model parameters of a feature extraction unit and an image recognition unit The model parameters of a feature extraction unit 320 and the image recognition unit are determined so as to minimize a first recognition error (D1) in a case where an image recognition unit (for example, a first image recognition unit 330) performs recognition processing by using, as an input, feature data output from the feature extraction unit 320.

However, in a case where an existing trained feature extraction unit and image recognition unit are reused, the processing of step 1 becomes unnecessary.

Note that the determined model parameters of the feature extraction unit 320 are set in the feature extraction unit 320. Furthermore, the determined model parameters of the image recognition unit are set in each of the first image recognition unit 330 and a second image recognition unit 360 (for example, also in the present embodiment, a trained first image recognition unit and a trained second image recognition unit are the same unit).—Step 2: Determine model parameters of an autoencoder unit Training processing of an autoencoder unit 1300 is executed with use of a trained feature extraction unit, a trained first image recognition unit, and a trained second image recognition unit, and model parameters of the autoencoder unit 1300 are determined so as to minimize a cost (L). —Step 3: Determine again model parameters of a trained first image recognition unit Model parameters of a trained first image recognition unit 1710 are determined again so as to minimize the first recognition error (D1) in a case where recognition processing is performed by using coded feature data as an input.

<Flow of Training Processing>

Figure 21:
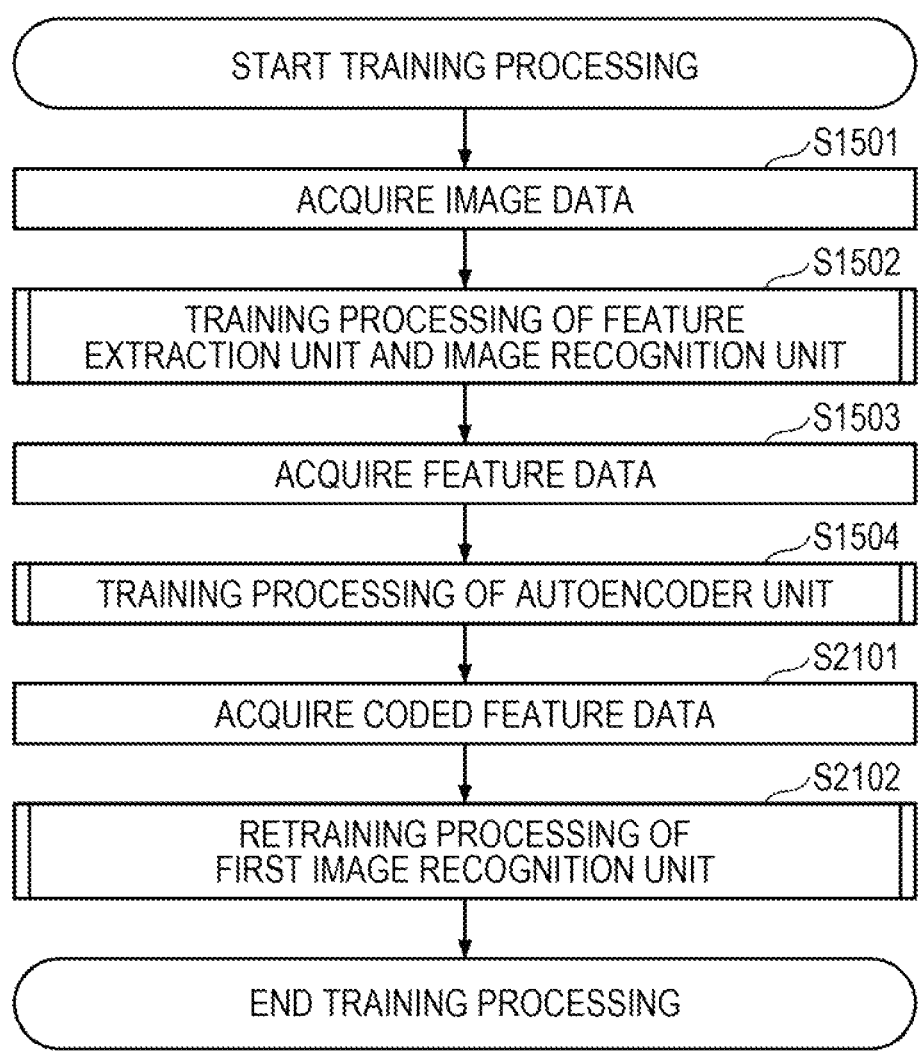
FIG. 21 is a third flowchart illustrating a flow of training processing by an image recognition system.

Next, a flow of training processing by an image recognition system 100 will be described. FIG. 21is a third flowchart illustrating a flow of training processing by the image recognition system. Note that the differences from the second flowchart illustrated in FIG. 15 are steps S2101 and S2102.

In step S2101, the training unit 121 inputs feature data to a trained autoencoder unit, and then acquires coded feature data output from a trained encoder unit.

In step S2102, the training unit 121 uses the acquired coded feature data to execute retraining processing on the trained first image recognition unit 1710.

<Details of Retraining Processing of Trained First Image Recognition Unit>

Figure 22B:
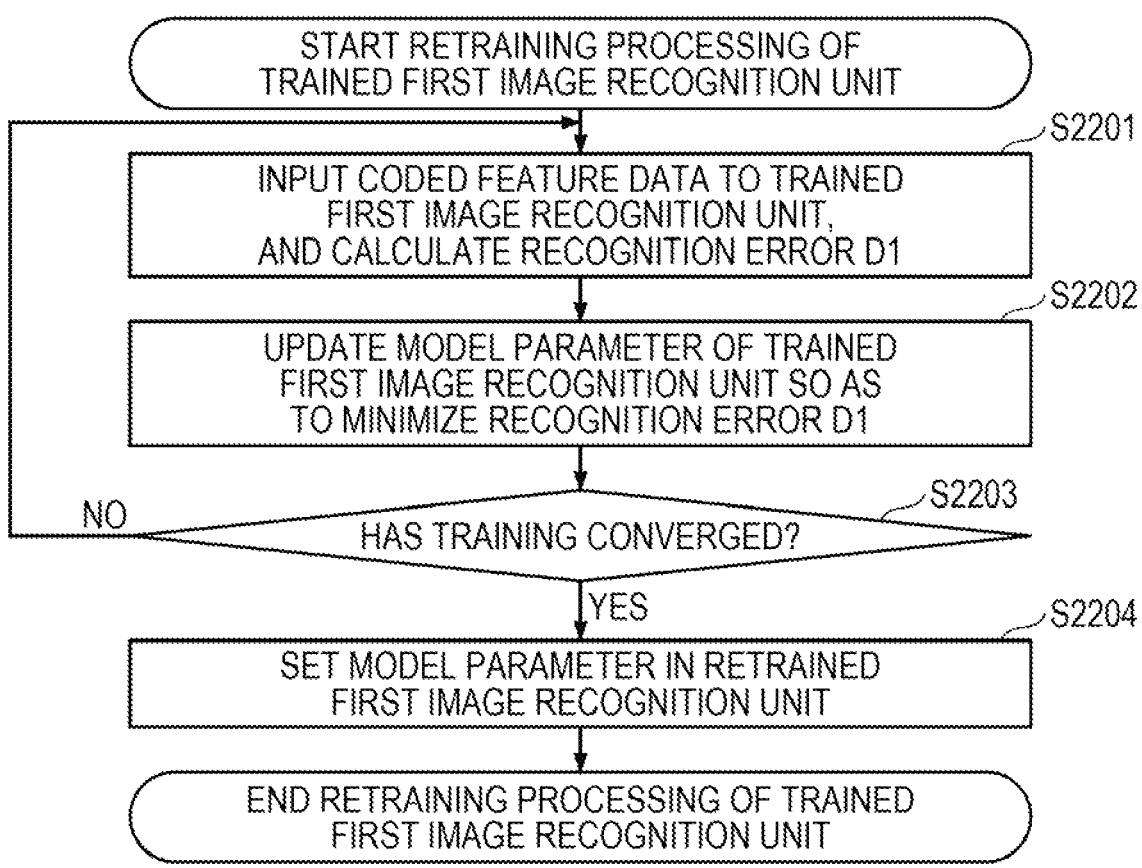

Next, details of the retraining processing (step S2102 in FIG. 21) of the trained first image recognition unit 1710 will be described with reference to FIGS. 22A and 22B. FIGS. 22A and 22B illustrate a functional configuration of a training unit at the time of retraining processing of a trained first image recognition unit, and a flowchart illustrating a flow of the retraining processing of the trained first image recognition unit.

As illustrated in FIG. 22A, at the time of retraining processing of the trained first image recognition unit 1710, among the units in the training unit 121, a trained encoder unit 1910, the trained first image recognition unit 1710, a first recognition error calculation unit 340, and an optimization unit 390 operate.

For example, as illustrated in FIG. 22B, in step S2201, the trained first image recognition unit 1710 performs recognition processing by using, as an input, coded feature data output from the trained encoder unit 1910, and outputs a recognition result. Furthermore, the first recognition error calculation unit 340 compares the output recognition result with a ground truth label associated with image data, and outputs a first recognition error (D1).

In step S2202, the optimization unit 390 updates the model parameters of the trained first image recognition unit 1710 again so as to minimize the first recognition error (D1).

In step S2203, the optimization unit 390 determines whether or not the training processing has converged. If it is determined that the training processing has not converged (if No in step S2203), the processing returns to step S2201.

On the other hand, if it is determined in step S2203 that the training processing has converged (if Yes in step S2203), the model parameters of the trained first image recognition unit 1710 are determined, and the processing proceeds to step S2204.

In step S2204, the training unit 121 sets, in the trained first image recognition unit 1710, the determined model parameters of the trained first image recognition unit 1710, and ends the retraining processing of the trained first image recognition unit. Consequently, a retrained first image recognition unit is generated.

<Specific Example of Image Recognition System in Compression and Recognition Phase>

Figure 23:
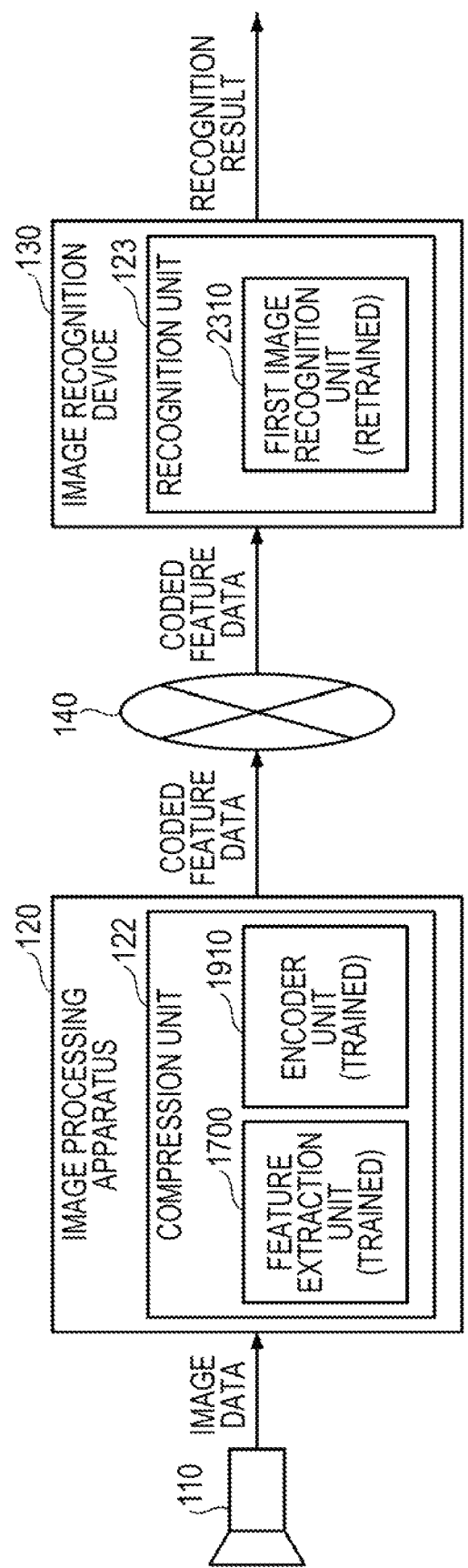
FIG. 23 is a third diagram illustrating an example of a system configuration of the image recognition system in a compression and recognition phase.

Next, a specific example of a system configuration of the image recognition system in a compression and recognition phase will be described. FIG. 23 is a third diagram illustrating a specific example of the system configuration of the image recognition system in the compression and recognition phase.

As illustrated in FIG. 23, in the compression and recognition phase, a compression unit 122 of the image processing apparatus 120 includes a trained feature extraction unit 1700 and the trained encoder unit 1910.

When the compression unit 122 of the image processing apparatus 120 receives an input of image data, the trained feature extraction unit 1700 outputs feature data.

Furthermore, the trained encoder unit 1910 encodes the feature data output from the trained feature extraction unit 1700 to generate the coded feature data. Moreover, the compression unit 122 transmits the coded feature data generated by the trained encoder unit 1910 to the image recognition device 130 via a network 140. Note that the coded feature data transmitted by the compression unit 122 is minimum coded feature data that allows the image data recognition accuracy to be maintained.

Furthermore, as illustrated in FIG. 23, in the compression and recognition phase, a recognition unit 123 of the image recognition device 130 includes a retrained first image recognition unit 2310.

When the recognition unit 123 of the image recognition device 130 receives coded feature data, the retrained first image recognition unit 2310 performs recognition processing by using the coded feature data as an input, and outputs a recognition result. The recognition result output by the retrained first image recognition unit 2310 is substantially equal to a recognition result in a case where recognition processing has been performed on the image data without being compressed. For example, according to the recognition unit 123, it is possible to maintain substantially the same recognition accuracy as the recognition accuracy in a case where recognition processing has been performed on the image data without being compressed.

<Flow of Compression and Recognition Processing>

Figure 24:
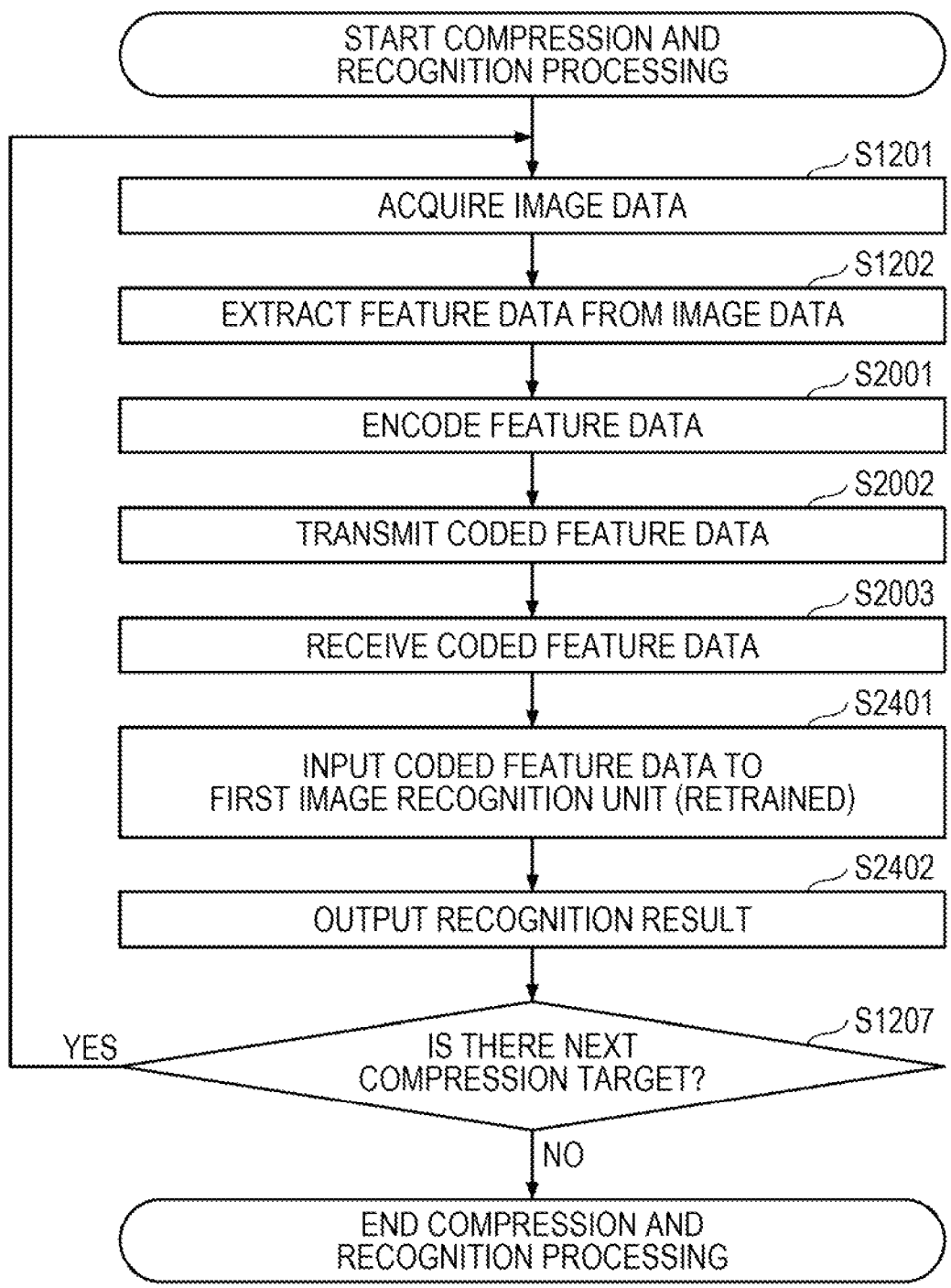
FIG. 24 is a third flowchart illustrating a flow of compression and recognition processing by the image recognition system.

Next, a flow of compression and recognition processing by the image recognition system 100 will be described. FIG. 24 is a third flowchart illustrating a flow of compression and recognition processing by the image recognition system. Among the steps of the compression and recognition processing illustrated in FIG. 24, the differences from FIG. 20 are steps S2401 and S2402.

In step S2401, the retrained first image recognition unit 2310 included in the recognition unit 123 of the image recognition device 130 performs recognition processing by using the coded feature data as an input.

In step S2402, the retrained first image recognition unit 2310 included in the recognition unit 123 of the image recognition device 130 outputs a recognition result.

As is clear from the above description, as in the second embodiment described above, an image processing apparatus according to the third embodiment generates a trained feature extraction unit, a trained first image recognition unit, and a trained second image recognition unit. Furthermore, as in the second embodiment described above, the image processing apparatus according to the third embodiment executes training processing in which model parameters of an autoencoder unit are determined so as to minimize a cost obtained by a weighted addition of information entropy of coded feature data and first and second recognition errors.

Moreover, the image processing apparatus according to the third embodiment inputs, to the trained first image recognition unit, coded feature data output from a trained encoder unit, and then outputs a recognition result. Moreover, the image processing apparatus according to the third embodiment determines again model parameters of the trained first image recognition unit so as to minimize a first recognition error, which is an error between ground truth data and a recognition result output from the trained first image recognition unit, and makes the trained first image recognition unit retrained.

In this way, by executing the training processing so as to minimize the cost, according to the third embodiment, it is possible to reduce the amount of image data while maintaining the recognition accuracy in the image recognition processing. In addition, according to the third embodiment, it is possible to reuse a trained feature extraction unit and image recognition unit, and sequentially determine the model parameters, and thus the training efficiency may be improved. Moreover, according to the third embodiment, a retrained first image recognition unit that directly outputs a recognition result without decoding coded feature data is generated, and this improves processing efficiency in an image recognition device.

Note that the embodiments are not limited to the configurations and the like described here, and may include combinations of the configurations or the like described in the above embodiments with other elements, and the like. These points can be changed without departing from the spirit of the embodiments, and can be appropriately determined according to application modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus, comprising:
a memory; and
a processor coupled to the memory and the processor configured to:
  identify a first recognition error, the first recognition error being an error between ground truth data and a first recognition result obtained by inputting a first feature of image data into a first image recognition model,
  generate a second feature obtained by adding noise to the first feature of the image data, identify a second recognition error, the second recognition error being an error between the first recognition result and a recognition result obtained by inputting the second feature into a second image recognition model, and
execute training of the first image recognition model and the second image recognition model based on the first recognition error and the second recognition error.

2. The image processing apparatus according to claim 1, wherein the processor is configured to
determine a model parameter in such a way as to minimize a sum obtained by a weighted addition of a value related to an amount of data of a feature of the image data, the first recognition error, and the second recognition error.

3. The image processing apparatus according to claim 1, wherein the processor is configured to:
store, in the memory, a feature extraction model that extracts the feature of the image data, and
determine a model parameter of the first image recognition model, a model parameter of the second image recognition model, and a model parameter of the feature extraction model.

4. The image processing apparatus according to claim 1, wherein the processor is configured to:
store, in the memory, a feature extraction model that extracts a feature of the image data,
acquire a first recognition result output from the first image recognition model by inputting the feature of the image data extracted from the feature extraction model,
generate a trained feature extraction model and a trained first image recognition model in which each model parameter of the feature extraction model and the first image recognition model is determined in such a way as to minimize the first recognition error, the first recognition error being an error between the ground truth data and the first recognition result that has been acquired, and
set the same model parameter as the model parameter of the trained first image recognition model in the second image recognition model.

5. The image processing apparatus according to claim 4, wherein the processor is configured to:
encode the feature of the image data extracted by the trained feature extraction model,
calculate the first recognition error, the first recognition error being an error between the ground truth data and a first recognition result obtained by inputting the coded feature into the trained first image recognition model,
encode the feature of the image data extracted by the trained feature extraction model,
generate a feature obtained by adding noise to the coded feature,
acquire a second recognition result is acquired, the second recognition result being obtained by inputting the feature obtained by decoding the feature to which the noise has been added into the second image recognition model on which the training has been executed, and
calculate the second recognition error, the second recognition error being an error between the second recognition result and the first recognition result.

6. The image processing apparatus according to claim 5, wherein the processor is configured to
execute training processing in which a model parameter of an autoencoder is determined in such a way as to minimize a sum obtained by a weighted addition of a value related to an amount of data of a coded feature that has been encoded, the first recognition error, and the second recognition error.

7. An image recognition system comprising:
an image processing apparatus that includes a first memory and a first processor coupled to the first memory; and
an image recognition device that includes a second memory and a second processor coupled to the second memory, wherein
the second processor is configured to:
identify a first recognition error, the first recognition error being an error between ground truth data and a first recognition result obtained by inputting a first feature of image data into a first image recognition model,
generate a second feature obtained by adding noise to the first feature of the image data,
identify a second recognition error, the second recognition error being an error between the first recognition result and a recognition result obtained by inputting the second feature into a second image recognition model, and
execute training of the first image recognition model and the second image recognition model based on the first recognition error and the second recognition error.

8. The image recognition system according to claim 7, wherein
the first processor is configured to set a trained feature extraction model in which a model parameter determined by execution of training processing,
the second processor is configured to set a trained first image recognition model in which a model parameter determined by execution of training processing, and
the trained first image recognition model performs recognition processing by using, as an input, a feature extracted from image data.

9. The image recognition system according to claim 7, wherein
the first processor is configured to set a trained feature extraction model and a trained encoder in which a model parameter determined by execution of training processing,
the second processor is configured to set a trained first decoder and a trained first image recognition model in which a model parameter determined by execution of training processing, and
the trained first image recognition model performs recognition processing by using, as an input, a feature obtained by the trained first decoder decoding a coded feature that has been extracted from image data and encoded by processing by the trained feature extraction model and the trained encoder.

10. A non-transitory computer-readable storage medium storing a program that causes a computer to execute a process, the process comprising:
identifying a first recognition error, the first recognition error being an error between ground truth data and a first recognition result obtained by inputting a first feature of image data into a first image recognition model,
generating a second feature obtained by adding noise to the first feature of the image data,
identifying a second recognition error, the second recognition error being an error between the first recognition result and a recognition result obtained by inputting the second feature into a second image recognition model, and executing training of the first image recognition model and the second image recognition model based on the first recognition error and the second recognition error.

* * * * *